(12) United States Patent
Einert et al.

(10) Patent No.: US 11,192,508 B2
(45) Date of Patent: Dec. 7, 2021

(54) WIRING HARNESS, VEHICLE COMPONENT, MOLD, MOLD SYSTEM AND METHOD FOR MANUFACTURING THE WIRING HARNESS

(71) Applicant: YAZAKI SYSTEMS TECHNOLOGIES GMBH, Regensburg (DE)

(72) Inventors: Martin Einert, Bad Abbach (DE); Gotz Roderer, Tegernheim (DE); Aldo Navarro Malaga, Stuttgart (DE); Dietrich Von Knorre, Ganderkesee (DE); Adam Neal, Welwyn Garden (GB)

(73) Assignee: YAZAKI SYSTEMS TECHNOLOGIES GMBH, Regensburg (DE)

( * ) Notice: Subject to any disclaimer, the term of this patent is extended or adjusted under 35 U.S.C. 154(b) by 145 days.

(21) Appl. No.: 16/099,913

(22) PCT Filed: May 9, 2017

(86) PCT No.: PCT/EP2017/061054
§ 371 (c)(1),
(2) Date: Nov. 8, 2018

(87) PCT Pub. No.: WO2017/194538
PCT Pub. Date: Nov. 16, 2017

(65) Prior Publication Data
US 2019/0161032 A1 May 30, 2019

(30) Foreign Application Priority Data
May 9, 2016 (DE) ..................... 10 2016 108 522.7

(51) Int. Cl.
*B60R 16/02* (2006.01)
*B29C 45/14* (2006.01)
(Continued)

(52) U.S. Cl.
CPC .... *B60R 16/0215* (2013.01); *B29C 45/14065* (2013.01); *B29C 45/14549* (2013.01);
(Continued)

(58) Field of Classification Search
CPC ......... B29C 45/14065; B29C 45/14549; B29L 2031/3462; B60R 16/0207;
(Continued)

(56) References Cited

U.S. PATENT DOCUMENTS 4,498,938 A * 2/1985 Moisson ................. F16G 11/02
156/49
5,911,450 A * 6/1999 Shibata ............... B60R 16/0207
174/112
(Continued)

FOREIGN PATENT DOCUMENTS

CN      102870168 A    1/2013
DE      37 10 642 A1    10/1988
(Continued)

OTHER PUBLICATIONS

Communication dated Mar. 31, 2020, from the Japanese Patent Office in application No. 2018-559975.
(Continued)

*Primary Examiner* — Timothy J Thompson
*Assistant Examiner* — Rhadames Alonzo Miller
(74) *Attorney, Agent, or Firm* — Sughrue Mion, PLLC

(57) ABSTRACT

The invention relates to a wiring harness (1010), a motor vehicle component (1000), a mold (15) for manufacturing a wiring harness (1010), a mold system (10) and a method for manufacturing the wiring harness (1010), the wiring harness (1010) comprising at least one bunch (1020) of at least two
(Continued)

cables (1025) and a sheath (1030), at least some sections of the bunch (1020) of cables being embedded in the sheath (1030).

9 Claims, 16 Drawing Sheets

(51) Int. Cl.
  *H01B 7/00* (2006.01)
  *H01B 7/36* (2006.01)
  *H01B 13/012* (2006.01)
  *B29L 31/34* (2006.01)
(52) U.S. Cl.
  CPC ....... *B60R 16/0207* (2013.01); *H01B 7/0045* (2013.01); *H01B 7/365* (2013.01); *H01B 13/01209* (2013.01); *B29K 2827/18* (2013.01); *B29K 2859/00* (2013.01); *B29L 2031/3462* (2013.01)
(58) Field of Classification Search
  CPC .......... B60R 16/0215; H01B 13/01209; H01B 7/0045; H01B 7/365
  See application file for complete search history.

(56) References Cited

U.S. PATENT DOCUMENTS

| | | | |
|---|---|---|---|
| 5,922,996 A * | 7/1999 | Ryeczek | G01K 11/12 |
| | | | 116/207 |
| 2002/0170739 A1* | 11/2002 | Ryeczek | H01B 7/36 |
| | | | 174/112 |
| 2011/0097948 A1* | 4/2011 | Melni | H01R 9/11 |
| | | | 439/733.1 |
| 2013/0277087 A1 | 10/2013 | Hayakawa et al. | |
| 2014/0190741 A1* | 7/2014 | Hayakawa | B60R 16/0215 |
| | | | 174/72 A |
| 2014/0190742 A1* | 7/2014 | Kajiwara | B29C 43/305 |
| | | | 174/72 A |
| 2014/0317921 A1 | 10/2014 | Yamamoto et al. | |
| 2015/0115792 A1 | 4/2015 | Kuo et al. | |
| 2016/0055725 A1* | 2/2016 | Kreiner | G01R 21/133 |
| | | | 340/657 |

FOREIGN PATENT DOCUMENTS

| | | |
|---|---|---|
| DE | 197 28 286 C1 | 2/1999 |
| DE | 101 34 252 C1 | 11/2002 |
| DE | 103 28 688 A1 | 1/2005 |
| DE | 10 2009 001 751 A1 | 9/2010 |
| DE | 10 2014 226 335 A1 | 6/2016 |
| EP | 0 787 626 A2 | 8/1997 |
| EP | 2 535 902 A1 | 12/2012 |
| JP | 61138415 A | 6/1986 |
| JP | 6445433 U | 3/1989 |
| JP | 2009093903 A | 4/2009 |
| JP | 2013089526 A | 5/2013 |

OTHER PUBLICATIONS

International Search Report for PCT/EP2017/061054 dated Jul. 19, 2017 [PCT/ISA/210].

* cited by examiner

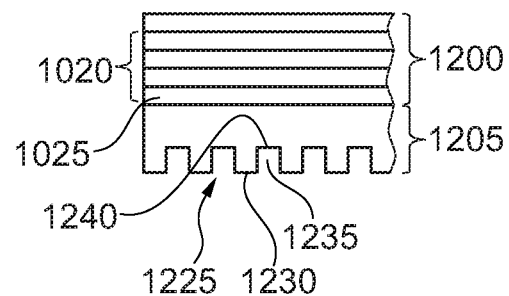
Fig. 3E
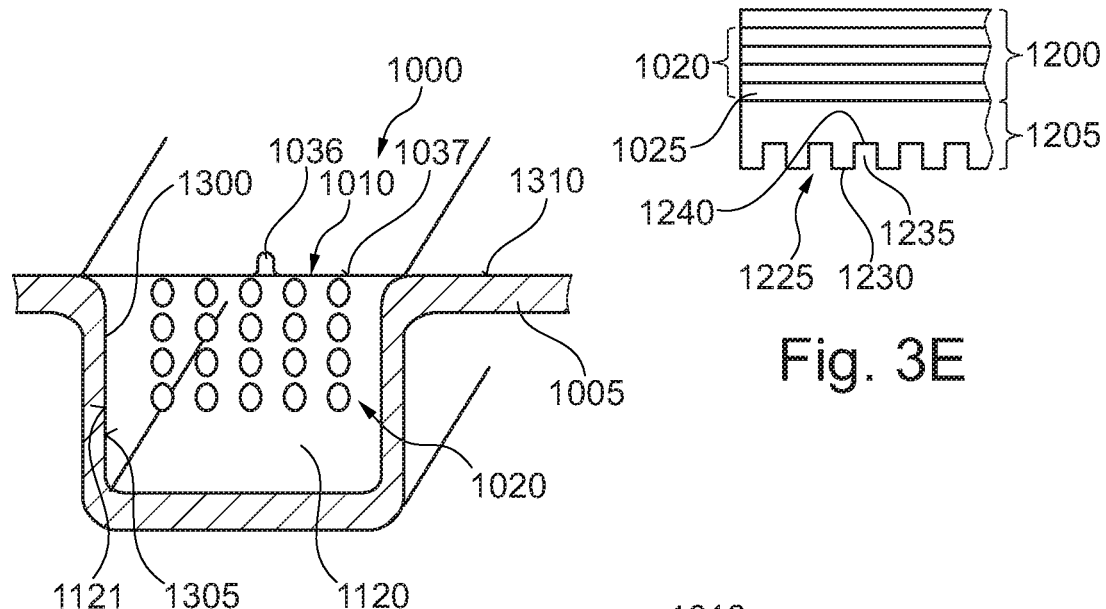
Fig. 4A
Fig. 4B
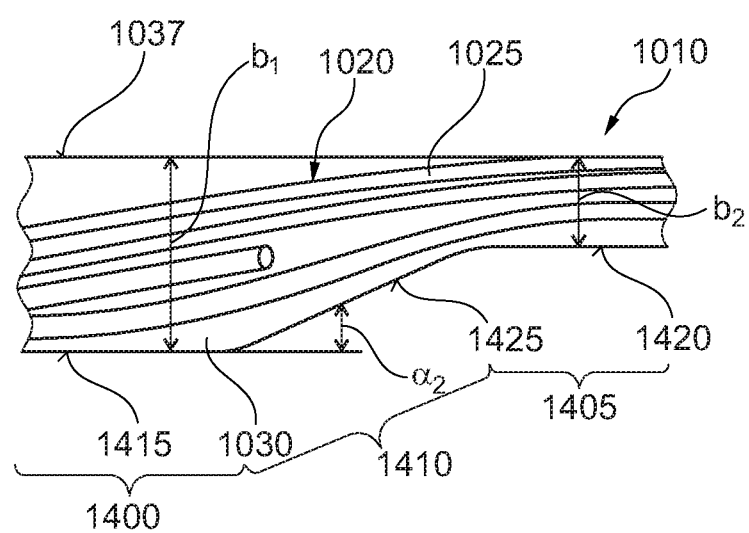
Fig. 5

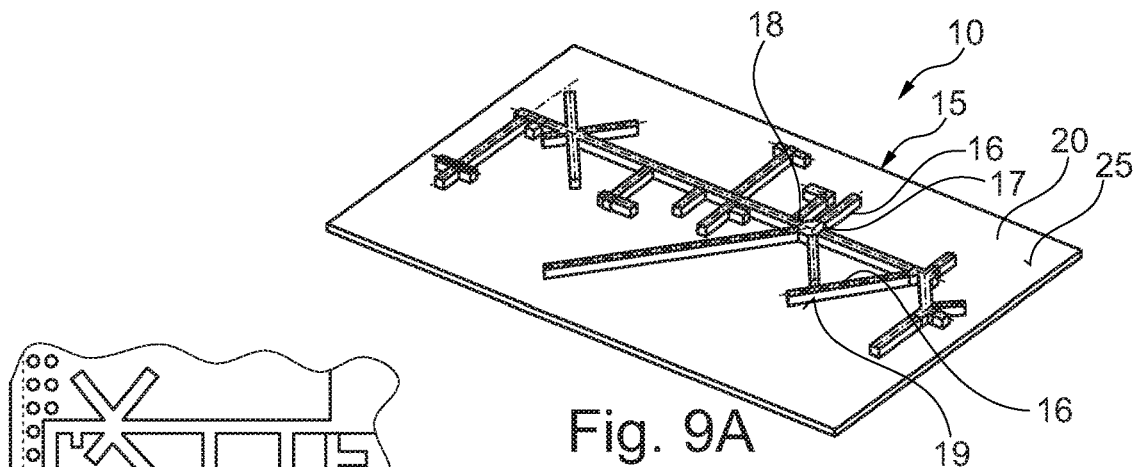
Fig. 9A
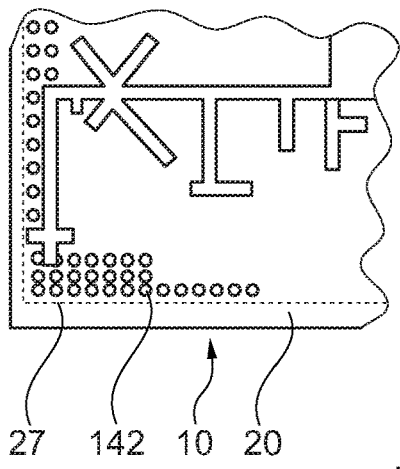
Fig. 9B
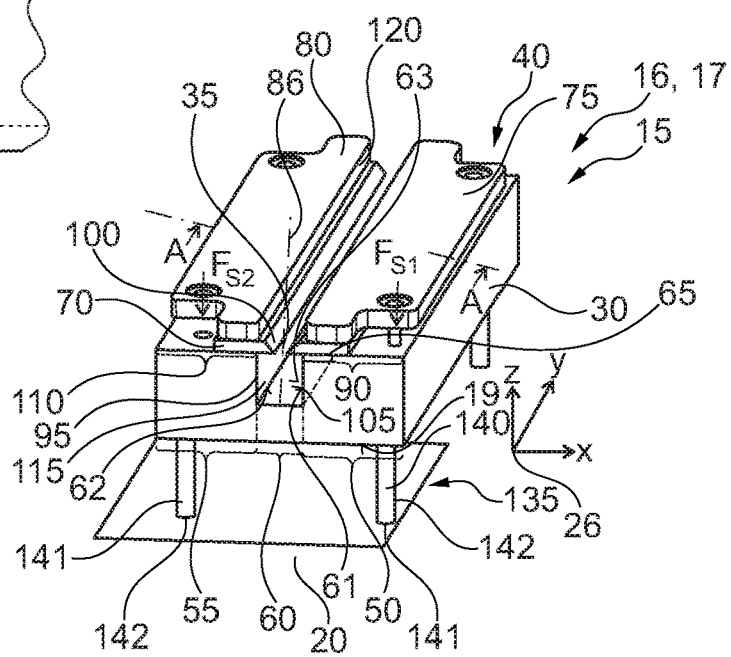
Fig. 10
Fig. 11A

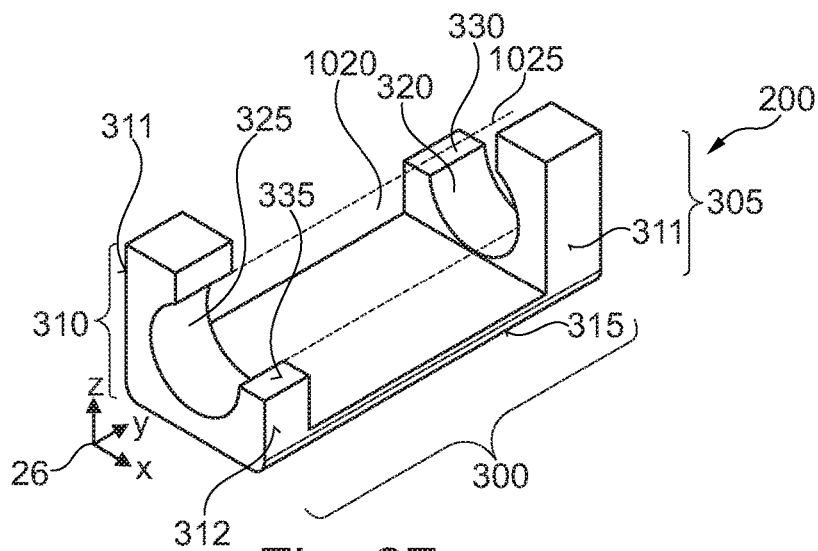
Fig. 27
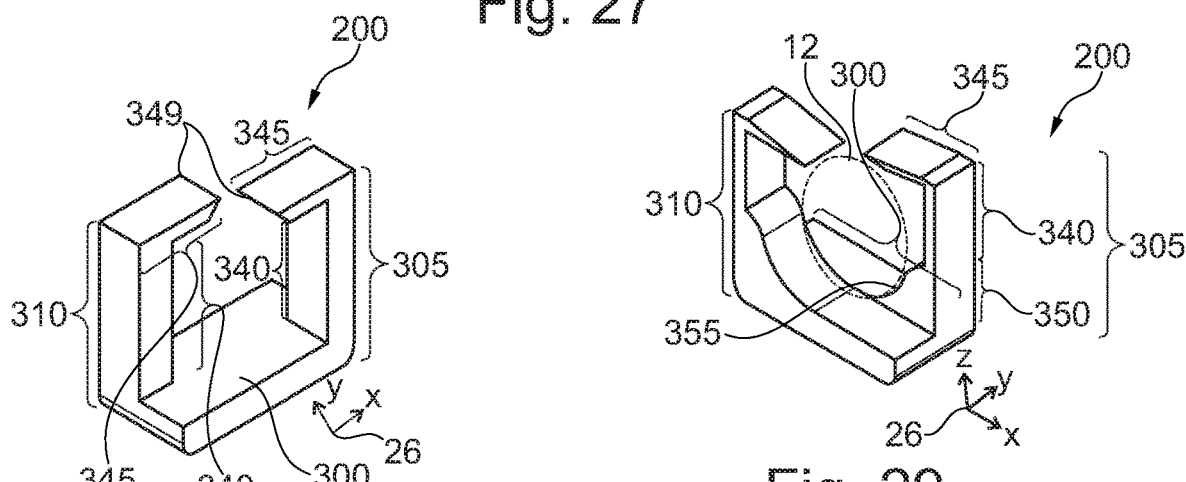
Fig. 28
Fig. 29
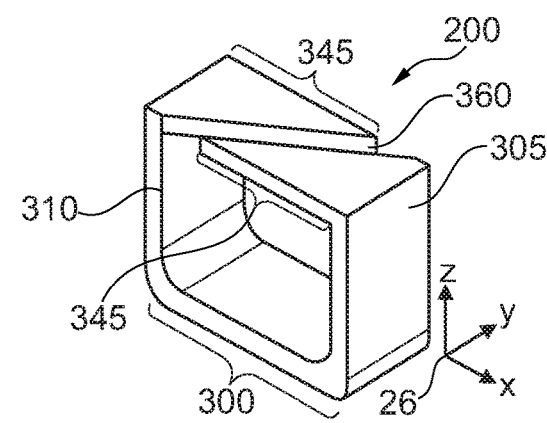
Fig. 30

WIRING HARNESS, VEHICLE COMPONENT, MOLD, MOLD SYSTEM AND METHOD FOR MANUFACTURING THE WIRING HARNESS

CROSS-REFERENCE TO RELATED APPLICATION

This application is a National Stage of International Application No. PCT/EP/2017/061054, filed on May 9, 2017, which claims priority from German Patent Application No. 10 2016 108 522.7, filed on May 9, 2017.

BACKGROUND

Field of the Invention

The invention relates to a wiring harness, to a vehicle component of a motor vehicle, to a mold for manufacturing a wiring harness, to a mold system and to a method for manufacturing the wiring harness.

Background

Wiring harnesses with individual cables for connecting different components in a motor vehicle are known. In this context, the cables are strung on a mounting board and wound in a winding tape. The wiring harness is produced substantially in a manual way, and therefore the production of the wiring harness is particularly expensive.

It is the object of the invention to provide an improved wiring harness, an improved vehicle component, an improved mold, an improved mold system and an improved method for manufacturing a wiring harness of this kind.

SUMMARY OF THE INVENTION

This object is achieved by means of a wiring harness for a motor vehicle as described and claimed. Advantageous embodiments are indicated in the dependent claims.

It was recognized that an improved wiring harness for a motor vehicle can be provided if the wiring harness has a cable bundle with at least two cables and an envelope. At least some section or sections of the cable bundle is/are embedded in the envelope. In this way, it is possible to dispense with laborious winding of the cable bundle. Moreover, the envelope ensures that the wiring harness can be bent and guided around tight radii particularly easily. Moreover, the individual cables of the cable bundle are protected by the envelope.

In another embodiment, the envelope has an indicating element on the outside, wherein the indicating element is routed parallel to the cable bundle in order to indicate a position of the cable bundle, wherein the indicating element extends substantially over the entire longitudinal extent of the envelope, wherein at least some section or sections of the indicating element is/are configured to correspond to a geometrical configuration of a holding device of a mold. The first bulge is a simple means of indicating the alignment of the cable bundle in the envelope, thus enabling the wiring harness to be laid particularly quickly in the motor vehicle.

In another embodiment, the indicating element has a first bulge, wherein the first bulge is of bead-type configuration, and/or wherein the indicating element has a notch on the outside of the envelope. This enables the cable bundle to be found particularly quickly in the envelope when repairing the wiring harness.

In another embodiment, the first bulge extends substantially over an entire longitudinal extent of the envelope.

In another embodiment, the wiring harness has a first fastening element. At least some section or sections of the first fastening element is/are embedded in the envelope. The first fastening element is configured to hold at least one of the cables of the cable bundle in a predefined position. In this way, heating of the wiring harness can be fixed in a defined way, thus reliably avoiding even local overheating of the wiring harness. It is thereby possible to avoid irreversible damage to the wiring harness in a simple way.

In another embodiment, the wiring harness has a second fastening element. The second fastening element has a first section, which is embedded in the envelope. The second fastening element furthermore has a second section, which is configured to engage in a vehicle component of the motor vehicle in order to fasten the wiring harness on the vehicle component.

In another embodiment, the envelope has a first layer, a second layer and preferably a third layer, wherein the cable bundle is embedded in the first layer, wherein the first layer comprises a first material, and the second layer comprises a second material, wherein the second material preferably has a different elasticity from, preferably a higher elasticity than, the first material, wherein the second layer is preferably of rectangular configuration or has a rib structure, wherein, on a side facing the first layer, the second layer preferably has a surface provided with a predefined surface structure, wherein, on a side facing away from the first layer, the second layer is preferably of flat configuration, wherein the third layer is preferably arranged on a side of the second layer which faces away from the first layer, wherein the third layer comprises at least one material, wherein the third material comprises an adhesive and/or has a third elasticity, which is different from, preferably lower than, the first and/or the second elasticity. This enables the second layer to serve as a protection for the cable bundle, thus avoiding possible damage to the cable bundle, e.g. by sharp edges of a body of the vehicle.

In another embodiment, the first layer is of slimmer configuration in a direction transverse to the cable bundle than the second layer, wherein the first layer is configured to engage in a recess in a vehicle component, wherein the first layer preferably has a trapezoidal cross section and the second layer preferably has a substantially rectangular cross section.

In another embodiment, the envelope has a second bulge, wherein the wiring harness can be passed through a feedthrough opening in a vehicle component, wherein the second bulge extends with a slope relative to a longitudinal extent of the cable bundle, wherein the second bulge is configured to form a, preferably fluidtight, separation between two spaces in the vehicle component, at least in some section or sections, wherein the second bulge has a bulge contour, wherein the second bulge is configured to press the bulge contour against a feedthrough opening contour of the feedthrough opening in order to provide substantially fluidtight separation between the spaces.

In another embodiment, the envelope has a second bulge, wherein the second bulge extends with a slope relative to a longitudinal extent of the cable bundle, wherein the second bulge is configured to form a, preferably fluidtight, separation between two spaces in the vehicle component, at least in some section or sections, wherein the second bulge has a bulge contour, wherein the second bulge is configured to press the bulge contour against a recess contour of a recess in a vehicle component in order to provide a frictional connection between the recess and the second bulge and to fasten the wiring harness frictionally in the recess. This enables the wiring harness to the fastened in the motor vehicle in a particularly simple way.

In another embodiment, the envelope has a first envelope section and a second envelope section. The first envelope section has a first transverse extent with respect to a first direction of longitudinal extent of the first envelope section. The second envelope section has a second transverse extent with respect to a second longitudinal extent of the second envelope section. The first transverse extent is greater than the second transverse extent.

The envelope has a transitional section. The transitional section is arranged between the first envelope section and the second envelope section. The first envelope section has a first lateral surface and the second envelope section has a second lateral surface. The transitional section has a transitional surface, which has a slope relative to the first lateral surface and the second lateral surface. The slope has an angle, wherein the angle has a value which is less than 45°, in particular less than 30°, in particular less than 20°, in particular less than 15°, in particular less than 10°.

However, the object is also achieved by a vehicle component of a motor vehicle according to patent claim 8.

It has been recognized that an improved vehicle component for a motor vehicle can be provided if the vehicle component has a structure having at least one recess with a recess contour and has a wiring harness described above, wherein at least the second bulge engages in the recess, wherein the second bulge is arranged at least partially under prestress, preferably under compression, in the recess, and the second bulge presses the bulge contour against the recess contour and provides a frictional connection between the wiring harness and the vehicle component. It is thereby possible to make particularly efficient use of an available installation space within the vehicle component of the motor vehicle. Moreover, rattling of the wiring harness against a structure of the vehicle component is avoided by means of the surface-to-surface contact with the structure.

In another embodiment, the wiring harness is arranged in the recess, wherein the structure has a surface adjoining the recess, wherein the surface and an upper side are of stepless configuration, and the surface and the upper side preferably extend in a common plane. In this way, the wiring harness can be laid in the vehicle with a particularly small installation space requirement and, at the same time, fixing of the wiring harness can be ensured in a simple manner. Furthermore, catching of other components of the motor vehicle on the wiring harness when mounted on the structure is avoided.

However, the object is also achieved by means of a mold for manufacturing the above-described wiring harness. Advantageous embodiments are indicated below.

It has been recognized that an improved mold for manufacturing a wiring harness can be provided if the mold has a wall and an opening. The wall delimits a mold cavity, at least laterally. The mold cavity adjoins the opening at the top.

By virtue of the upwardly open mold, the cables can be laid particularly easily during the manufacture of the wiring harness without having to be pulled around pins. As a result, the wiring harness can be manufactured particularly quickly. Moreover, it is also possible for the cables to be laid automatically by means of a robot, and therefore manufacturing costs are further reduced by automation.

In another embodiment, the mold has a holding device. The holding device is arranged on the wall and covers the opening, at least in some section or sections, wherein the holding device is of plate-type and/or brush-type configuration, wherein the holding device comprises a material which is capable of reversible elastic deformation, and the holding device can be bent reversibly through at least 70°, preferably through 90°, preferably into the mold cavity. This avoids a situation where the cables laid in the mold cavity can accidentally slip out. Floating of the cables in the mold cavity during the foaming of the envelope is also avoided.

It is particularly advantageous here if the wall has a wall base, wherein the holding device is arranged parallel to the wall base, at least in some section or sections.

In another embodiment, the wall has a first wall section and a second wall section. The first wall section is arranged opposite the second wall section, wherein the holding device comprises a first holding element and a second holding element, wherein the first holding element is arranged on the first wall section, and the second holding element is arranged on the second wall section, wherein the first holding element and the second holding element each end with a free end over the opening and close the mold cavity, at least in some section or sections, wherein the first wall section and/or the second wall section are/is preferably provided with an undulating profile, at least in some section or sections.

In another embodiment, the free ends of the holding elements are arranged spaced apart, and/or the holding elements are arranged in an overlapping manner over the opening.

In another embodiment, the first wall section has a first wall region and a second wall region, wherein the first wall region is arranged substantially parallel to the second wall section, wherein the second wall region extends in a manner offset from the first wall region in a direction away from the second wall section, with the result that the mold cavity has a widened portion, wherein the second wall region is configured to correspond to the first bulge contour and/or to the second bulge contour.

In another embodiment, an aperture is provided in the wall, wherein the aperture is configured as a through opening and is arranged in a wall bottom of the mold, wherein the wall bottom delimits the mold cavity at the bottom, wherein the aperture is configured to accommodate at least a section of the first and/or second fastening element of the wiring harness, and/or wherein an ejector for removing the wiring harness from the mold is configured to reach through the aperture, wherein the aperture is preferably configured to correspond to the ejector. As a result, the wiring harness can be removed from the mold particularly easily and by machine.

In another embodiment, an aperture is provided in the wall, wherein the aperture is configured to accommodate at least a section of the first and/or the second fastening element of the wiring harness.

In another embodiment, the wall has a first wall surface section, a second wall surface section and a wall surface transitional section, wherein the first wall surface section is preferably arranged lower than the second wall surface section, wherein the wall surface transitional section is arranged between the first wall surface section and the second wall surface section, wherein the wall surface transitional section is arranged with a slope relative to the first wall surface section and the second wall surface section, wherein the slope preferably has an angle, wherein the angle has a value which is less than 45°, in particular less than 30°, in particular less than 20°, in particular less than 15°, in particular less than 10°. This avoids cracking in the wiring harness at the transition between the first wall envelopeing section and the second wall envelopeing section.

In another embodiment, the first wall surface section and the second wall surface section are arranged in two planes arranged parallel to one another.

In another embodiment, the holding device is configured so as to follow the wall and to be interrupted in some section or sections and/or to be continuous.

In another embodiment, the holding device comprises silicone as the material. In addition or as an alternative, the wall comprises at least one of the following materials: polytetrafluoride, polyoxymethylene.

These materials have a particularly low surface tension as compared with the material of the envelope, thus ensuring reliable demolding of the wiring harness after the curing of the envelope. In particular, it is also ensured, through the use of the materials for the wall, that a large number of wiring harnesses can be manufactured with the mold without further cleaning or reprocessing steps to produce the original mold being required in addition.

In another embodiment, the wall has a wall surface which faces the mold cavity, wherein the wall surface is laser-polished, at least in some section or sections. By means of laser polishing, any scoring that may be present, due, in particular, to the mold cavity being milled into the mold, is mitigated, with the result that the molding and removal of the wiring harness from the mold is reliably ensured.

In another embodiment, the wall is profiled in an undulating and/or rib-shaped and/or planar manner, at least in some section or sections. This enables the wiring harness to be matched optimally to the geometrical boundary conditions in the vehicle in a simple manner.

In another embodiment, a sealing element is arranged at one longitudinal end of the wall in order at least partially to prevent emergence of the envelope from the mold cavity.

In another embodiment, the mold has a first mold part and a second mold part. The first mold part has a first engagement element at one longitudinal end. The second mold part has a socket configured to correspond to the first engagement element at a longitudinal end of the second mold part which faces the longitudinal end of the first mold part. The first engagement element engages in the first socket and connects the first mold part positively to the second mold part, wherein the engagement element and the socket are configured in such a way in relation to one another that removal in the longitudinal direction is blocked by the engagement of the engagement element in the socket, wherein the engagement element and the first mold part are preferably of integral and materially unitary configuration. This enables the mold to be expanded or adapted particularly easily.

In another embodiment, the mold is configured to be fastened on a mounting board of a mold system.

However, the object is also achieved by a mold system.

It has been recognized that an improved mold system can be provided if the mold system comprises a mold and a mounting board, wherein the mold is configured as described above, wherein, on a side facing the mounting board, the mold has a further engagement element and, on a side facing the mold, the mounting board has at least one grid having a plurality of further sockets, or wherein, on a side facing the mounting board the mold has a further socket and, on a side facing the mold, the mounting board has a grid having a plurality of further engagement elements, wherein the further engagement element and the further socket are arranged in a manner corresponding to one another, wherein the further engagement element engages in one of the further sockets and connects the mounting board positively and in a reversibly detachable manner to the mold, wherein the other further sockets of the grid remain free or wherein one of the further engagement elements engages in the further socket and connects the mounting board positively and in a reversibly detachable manner to the mold, wherein the other further engagement elements of the grid remain free, wherein the further engagement element is preferably of integral and materially unitary configuration with the mold or with the mounting board.

As a result, the mold can be mounted particularly quickly on the mounting board, or the mold system can be adapted particularly quickly to a different wiring harness to be manufactured.

However, the object is also achieved by a method. Advantageous embodiments are indicated below.

According to the invention, it has been recognized that an improved method for manufacturing a wiring harness configured as described above can be provided if a mold configured as described above is provided, wherein at least one cable of the cable bundle is laid in the mold cavity, wherein, as the cable is laid in the mold cavity, the holding device is deformed and opened reversibly in such a way out of a closed position in a first region by means of a means, preferably being bent into the mold cavity or bent away from the mold cavity, that the opening is free in the first region, at least in some section or sections, and the holding device remains in the closed position in a second region and closes the opening, wherein the cable is laid in the mold cavity through the first region, wherein the means is moved along the mold cavity, wherein, after the removal of the means, the holding device relaxes and closes the mold cavity again, wherein at least one material of the envelope is introduced into the mold cavity, wherein the material flows in the direction of gravity in a processing time of the material of the envelope and, in doing so, encloses the cables of the cable bundle, at least in some section or sections.

In another embodiment, as the cable is laid in the first region, the first holding element and the second holding element are bent apart reversibly out of the closed position by the means, preferably being bent out into the mold cavity or away from the mold cavity or being bent in the longitudinal direction of the mold cavity, wherein, after the removal of the means, the holding elements bend back into the closed position and close the opening again.

In another embodiment, after the introduction of the material of the envelope into the mold cavity, a cover is placed on the holding device, wherein the cover at least partially blocks bending open of the holding device on a side facing away from the mold cavity.

In another embodiment, the material of the envelope is first of all introduced into the mold cavity above the first wall surface section and, during a subsequent time period, is introduced into the mold cavity above the second wall surface section and into the mold cavity above the wall surface transitional section.

In another embodiment, the material of the envelope is applied in a manner fluctuating in an undulating fashion in the transverse direction with respect to the cable bundle between the first wall section and the second wall section. In this way, reliable embedding of the cable bundle in the surrounding wall is ensured.

BRIEF DESCRIPTION OF THE DRAWINGS

The invention is explained in greater detail below by means of figures, in which:

FIG. 3E shows a longitudinal section through a development of the vehicle component shown in FIG. 3A;

FIG. 4A shows a detail of a cross section through a vehicle component of the motor vehicle according to a fourth embodiment;

FIG. 4B shows a detail of a cross section through a development of the vehicle component shown in FIG. 4A;

FIG. 5 shows a longitudinal section through a wiring harness;

FIG. 9A shows a perspective view of a mold system for manufacturing at least one wiring harness shown in FIGS. 1 to 8;

FIG. 9B shows a plan view of the mold system shown in FIG. 9A;

FIG. 10 shows a perspective view of the first mold part of the mold shown in FIG. 9A and FIG. 9B according to a first embodiment;

FIG. 11A shows a section through the mold shown in FIG. 10, along a section plane A-A shown in FIG. 10;

FIG. 27 shows a perspective view of the first fastening element according to a first embodiment;

FIG. 28 shows a perspective view of a first fastening element according to a second embodiment;

FIG. 29 shows a perspective illustration of a first fastening element according to a third embodiment;

FIG. 30 shows a perspective view of a first fastening element according to a fourth embodiment;

DETAILED DESCRIPTION OF THE INVENTION

Figure 1A:
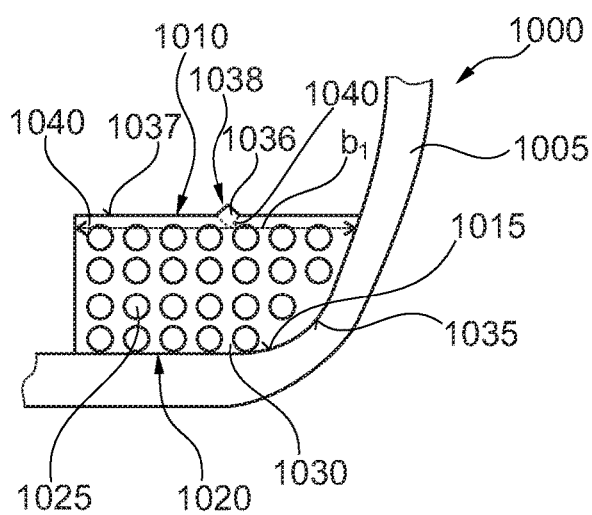
FIG. 1A shows a detail of a cross section through a vehicle component of a motor vehicle according to a first embodiment.

FIG. 1A shows a detail of a cross section through a vehicle component 1000 of a motor vehicle according to a first embodiment. The vehicle component 1000 has a structure 1005 and a wiring harness 1010. The structure 1005 can be a body, a deep-drawn part, a roof lining, a door panel, an intermediate panel, a soundproofing bulkhead or a cockpit, for example. The structure 1005 can be manufactured from sheet metal or plastic, for example. However, the structure 1005 can also be a plastic structure, a carpet or similar. The structure 1005 has a bearing surface 1015. The bearing surface 1015 faces the wiring harness 1010.

The wiring harness 1010 has a cable bundle 1020 comprising a plurality of cables 1025. The cables 1025 serve to transmit electric signals or an electric current between two points. The cables 1025 are arranged so as to run approximately in the same direction to one another. In this arrangement, a connecting system for connecting the wiring harness 1010 electrically to another electric device can be provided at the respective end of the wiring harness 1010. The cables 1025 of the cable bundle 1020 are embedded in an envelope 1030 of the wiring harness 1010. On the outside, the envelope 1030 has a lateral surface 1035 having an envelope contour.

The envelope 1030 preferably comprises at least one of the following materials: polyurethane, silicone, foam, closed-cell foam, open-cell foam, silicone foam, polyurethane foam. The wiring harness 1010 rests against the bearing surface 1015 by means of the lateral surface 1035. In this arrangement, an adhesive layer can additionally be provided between the bearing surface 1015 and the lateral surface 1035 in order to connect the wiring harness 1010 materially to the structure 1005.

In this arrangement, there is freedom of choice as regards the cross section of the envelope 1030, and it should preferably be chosen to correspond to the geometrical configuration of the bearing surface 1015. At the same time, it is particularly advantageous if the bearing contour and the envelope contour are identical in some section or sections, thus ensuring particularly good surface-to-surface contact between the wiring harness 1010 and the structure 1005.

It is particularly advantageous if the envelope 1030 comprises an indicating element 1038. The indicating element 1038 comprises a first bulge 1036, advantageously on an upper side 1037 of the wiring harness 1010. The first bulge 1036 projects above the upper side 1037. The first bulge 1036 is preferably of bead-type configuration and preferably extends parallel to the cable bundle 1020, at least in some section or sections. The indicating element 1038 can be arranged centrally with respect to a maximum first transverse extent $b_1$. It is thereby possible in a simple manner to indicate the route of the cables 1025 of the cable bundle 1020. The indicating element 1038 can furthermore be used to indicate a predefined side for the insertion of the wiring harness 1010 into the structure 1005, thus enabling the wiring harness 1010 to be mounted particularly quickly during the assembly of the motor vehicle. In addition or as an alternative, it is also conceivable for the indicating element 1038 to comprise a notch 1040 in the upper side 1037 (illustrated in dashed lines in FIG. 1A). The notch 1040 can serve to indicate a particular type of wiring harness 1010, for example.

Figure 1B:
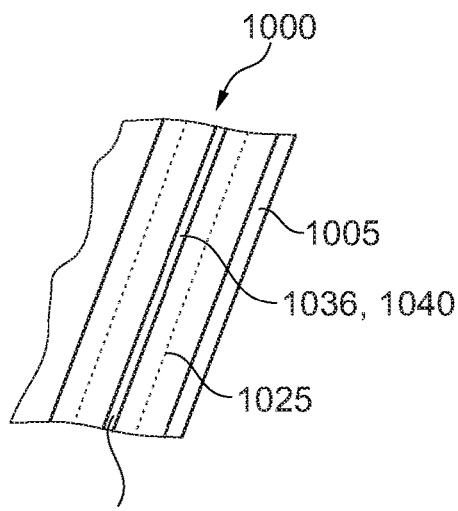
FIG. 1B shows a detail of a plan view of the vehicle component shown in FIG. 1A.

FIG. 1B shows a detail of a plan view of the vehicle component 1000 shown in FIG. 1A.

The indicating element 1038 extends substantially over the entire longitudinal extent of the wiring harness 1010. This enables an insertion position of the cable bundle 1020 in the envelope 1030 to be determined in a particularly simple manner. This is advantageous particularly when the envelope 1030 is of particularly thick configuration and it is not possible to either feel or see the cable bundle 1025 in the envelope.

Figure 2:
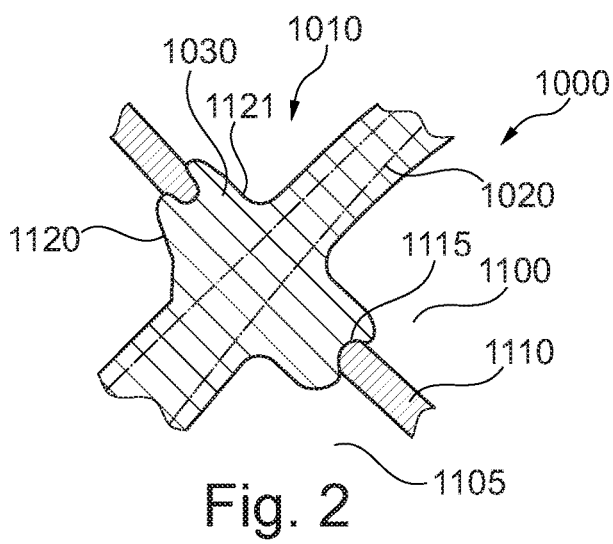
FIG. 2 shows a section through a vehicle component according to a second embodiment.

FIG. 2 shows a section through a vehicle component 1000 according to a second embodiment. The vehicle component 1000 is configured in such a way as to be substantially identical to the vehicle component 1000 shown in FIG. 1A and FIG. 1B. The structure 1005 has a first space 1100 and a second space 1105. A partition wall 1110 is provided between the first space 1100 and the second space 1105. The partition wall 1110 has an opening 1115. The wiring harness 1010 is passed through the opening 1115.

The wiring harness 1010 is configured in such a way as to be substantially identical to the wiring harness 1010 illustrated in FIG. 1A and FIG. 1B. In addition, the envelope 1030 of the wiring harness 1010 has a second bulge 1120. The second bulge 1120 extends transversely to a longitudinal extent of the cable bundle 1020. At least in the region of the second bulge 1120, the envelope 1030 advantageously comprises a flexible material. The second bulge 1120 has a bulge contour 1121. The second bulge 1120 is arranged in the opening 1115 and fills the opening 1115. The second bulge 1120 is preferably pressed/compressed into the opening 1115. As a result, the second bulge 1120 presses the bulge contour 1121 circumferentially against an opening contour 1122 of the opening 1115 and seals off the first space 1100 fluidically from the second space. Furthermore, noise transmission between the first space 1100 and the second space 1105 by the second bulge 1120 is thereby avoided. It is particularly advantageous here if the second bulge 1120 is arranged so as to encircle the cable bundle 1020. A particularly advantageous possibility here is for the second bulge 1120 to be of triangular configuration in cross section. It is thereby possible to dispense with the use of a grommet in the opening 1115.

Figure 3A:
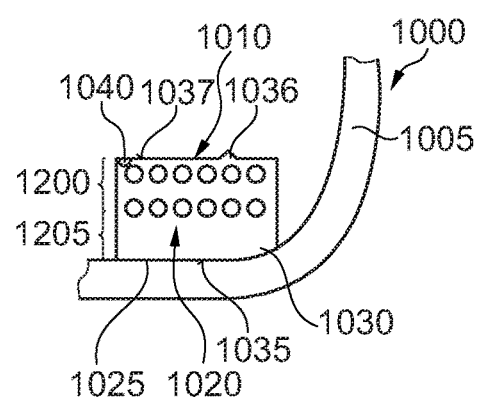
FIG. 3A shows a detail of a cross section through a vehicle component of the motor vehicle according to a third embodiment.

FIG. 3A shows a detail of a cross section through a vehicle component 1000 of the motor vehicle according to a third embodiment. The vehicle component is of similar configuration to the vehicle component 1000 shown in FIGS. 1 and 2. As a departure therefrom, the wiring harness 1010 has a first layer 1200 and a second layer 1205. The second layer 1205 is arranged below the first layer 1200 and between the first layer 1200 and the structure 1005. The cable bundle 1020 is embedded in the first layer 1200. In this arrangement, a first bulge 1036 adjoins the first layer 1200. The first layer 1200 preferably comprises a first material, and the second layer 1205 preferably comprises a second material. It is also possible for the first layer 1200 and the second layer 1205 to comprise an identical material. Here, the second material can have a different elasticity from the first material. Thus, it is advantageous, if the elasticity of the second material is greater than the elasticity of the first material, that rattling of the cable bundle 1020 can be avoided by means of the particularly elastic properties of the second layer 1205 on the structure 1005.

It is furthermore advantageous if the elasticity of the second material of the second layer 1205 is less than the elasticity of the first material since the second layer 1205 thereby forms a kind of plate which effectively protects the cable bundle 1020 from possible damage.

In this embodiment, the second layer 1205 is rectangular in cross section. Other configurations of the second layer 1205 are also conceivable. Thus, for example, the second layer 1205 can also be of semicircular, elliptical, U-shaped, C-shaped, cylindrical or some other configuration.

It is also conceivable for the second layer 1205, instead of having the flat configuration shown in FIG. 3, to have a rib structure in the longitudinal direction of the wiring harness 1010. This enables the wiring harness 1010 to be guided particularly well around a radius and, at the same time, allows a high level of protection to be provided for the cable bundle 1020 by the second layer 1205.

Figure 3B:
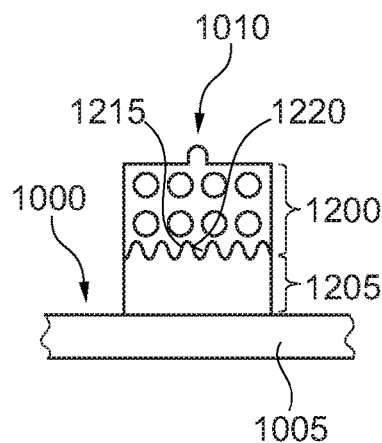
FIGS. 3B to 3D each show a detail of a cross section of a respective development of the vehicle component shown in FIG. 3A.

FIG. 3B shows a detail of a cross section of a development of the vehicle component 1000 shown in FIG. 3A. The wiring harness 1010 is of substantially identical configuration to the wiring harness 1010 shown in FIG. 3. As a departure therefrom, the second layer 1200 has a defined surface structure 1215 on a surface 1220 facing the first layer 1200. The surface structure 1215 is of undulating configuration, for example. This increases the size of the surface 1220 of the second layer 1205 and improves adhesion of the first layer 1205 on the second layer 1200 in comparison with the configuration shown in FIG. 3A.

Figure 3C:
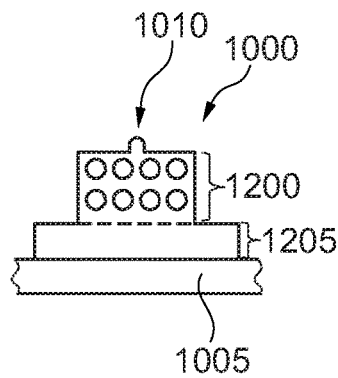

FIG. 3C shows a detail of a cross section of a development of the vehicle component 1000 shown in FIG. 3A. As a departure therefrom, the first layer 1200 is of slimmer configuration than the second layer 1205 in a direction transverse to the cable bundle 1020.

Figure 3D:
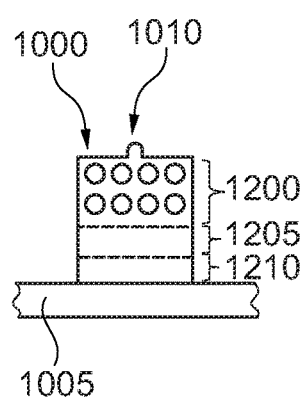

FIG. 3D shows a detail of a cross section of a development of the vehicle component 1000 shown in FIG. 3. In addition, the envelope 1030 has a third layer 1210. The third layer 1210 is arranged on a side of the second layer 1205 facing away from the first layer 1200 and is connected to said second layer. The third layer 1210 comprises a third material with a third elasticity. The third elasticity is preferably less than the first elasticity and/or the second elasticity. The third layer 1210 is preferably configured as an impact plate or as an adhesive layer. In the case of configuration as an impact plate, it is advantageous that damage to the cable bundle 1020 can be avoided by means of the third layer 1210 and, at the same time, vibrations can be damped particularly effectively by means of the second layer 1205.

In this embodiment, by way of example, the layers 1200, 1205, 1210 are arranged in a rectangular shape of identical width in a stack of layers. The layers 1200, 1205, 1210 can also have different widths or configurations.

FIG. 3E shows a longitudinal section through a development of the vehicle component 1000 shown in FIG. 3A. A rib structure 1225 is provided in the second layer 1200. The rib structure 1225 has ribs 1230 and rib recesses 1235, which are arranged between the ribs 1230 in the longitudinal direction and delimits the ribs 1230 in the longitudinal direction. The rib recesses 1235 each have a recess base 1240, which is arranged spaced apart from the cables 1025 of the cable bundle 1020.

FIG. 4A shows a detail of a cross section through a vehicle component 1000 of the motor vehicle according to a fourth embodiment. The vehicle component 1000 is of substantially identical configuration to the vehicle component 1000 shown in FIGS. 1A to 3E. The structure 1005 has a groove-type recess 1300 having a recess contour 1301. By way of example, the recess 1300 is of rectangular configuration. The recess 1300 can be introduced into the structure 1005 during a pressing operation, for example.

The wiring harness 1010 is of substantially identical configuration to the embodiment shown in FIG. 3A. The wiring harness 1010 is arranged in the recess 1300. In this arrangement, the envelope 1030 has the second bulge 1120. The second bulge 1120 is preferably formed on the circumference, surrounding the cable bundle 1020 preferably on three sides and preferably being of layered configuration. The second bulge 1120 has a bulge contour 1121. The material of the second bulge 1120 is preferably elastic and integral and materially unitary with the material of the envelope 1030. In the unmounted state, the bulge contour 1121 of the second bulge 1120 is preferably larger in this case than the recess contour of the recess 1300.

When the wiring harness 1010 is mounted, the second bulge 1120 and the material thereof is compressed, with the result that the second bulge 1120 presses the bulge contour 1121 thereof against the recess contour of the recess 1300, thus connecting the wiring harness 1010 frictionally to the recess 1300 of the vehicle component 1000 via the second bulge 1120. It is thereby possible to accommodate the wiring harness 1010 in a particularly space-saving manner in the structure 1005 of the vehicle component 1000.

In particular, it is advantageous here that the structure 1005 has a surface 1310 adjoining the recess 1300, wherein the upper side 1037 of the wiring harness 1010 is configured in such a way as to be substantially without any transition or step relative to the surface 1310. The upper side 1037 and the surface of the structure 1005 preferably lie in a common plane. In the case of the wiring harness 1010, it is possible here to dispense with the second bulge 1120, wherein in this configuration the wiring harness 1010 fills the recess 1300 substantially completely. It is also possible for the second bulge 1120 to be provided in only some section or sections in the longitudinal direction, while the envelope 1030 is arranged at a distance from the recess contour 1305 in the remaining regions (without the second bulge 1120), for example.

FIG. 4B shows a cross section through a development of the vehicle component 1000 shown in FIG. 4A.

The configuration shown in FIG. 4B is substantially a combination of the configuration of the wiring harness 1010 shown in FIG. 3C with the configuration of the vehicle component 1000 shown in FIG. 4A. As a departure therefrom, the vehicle component 1000 has, in addition to the structure 1005, a holding structure 1006, which is arranged on the upper side at a distance from the recess 1300. Only the first layer 1200 engages in the recess 1300, whereas the second layer 1205 is arranged outside the recess 1300, between the holding structure 1006 and the structure 1005. The holding structure 1006 preferably presses against the second layer 1205 with a holding force $F_H$ and thus secures the wiring harness 1010 on the structure 1005. The holding structure 1006 can be secured on the structure 1005. The holding structure 1006 can also be a different vehicle subassembly from the structure.

FIG. 5 shows a longitudinal section through a wiring harness 1010. The envelope 1030 of the wiring harness 1010 has a first envelope section 1400, a second envelope section 1405 and a transitional section 1410. The transitional section 1410 is arranged between the first envelope section 1400 and the second envelope section 1405 in the longitudinal direction of the wiring harness 1010. The first envelope section 1400 has a first lateral surface 1415, and the second envelope section 1405 has a second lateral surface 1420. The lateral surfaces 1415, 1420 are preferably arranged in parallel in two planes arranged offset relative to one another at different levels. In this case, the lateral surfaces 1415, 1420 are of flat configuration, by way of example. Some other configuration of the lateral surfaces 1415, 1420 is also conceivable. The transitional section 1410 has a transitional surface 1425. The lateral surfaces 1415, 1420 and the transitional surface 1425 can be arranged on the lower side of the wiring harness 1010, laterally on the wiring harness 1010 or on the upper side of the wiring harness 1010. The transitional surface 1425 is arranged with a slope relative to the first lateral surface 1415 and the second lateral surface 1420. The slope has an angle $\alpha_1$, wherein the angle $\alpha_1$ has a value which is less than 45°, in particular less than 30°, in particular less than 20°, in particular less than 15°, in particular less than 10°. Cracking in the envelope 1030 at the transition between the first envelope section 1400 and the second envelope section 1405 is thereby avoided. Of course, it is also possible to conceive of dispensing with the transitional section 1410. It is also conceivable for the transitional surface 1425 to be of curved configuration instead of the flat configuration shown in FIG. 5. In this case, a convex or concave curvature is conceivable, in particular.

By virtue of the offset lateral surfaces 1415, 1420, the first envelope section 1400 has the first transverse extent $b_1$ with respect to a first direction of longitudinal extent of the first envelope section 1400, and the second envelope section 1405 has a second transverse extent $b_2$ with respect to a second direction of longitudinal extent of the second envelope section 1405. Here, the first transverse extent $b_1$ is greater than the second transverse extent $b_2$.

By way of example, the first direction of longitudinal extent in FIG. 5 is identical to the second direction of longitudinal extent. The first direction of longitudinal extent can also be different from the second direction of longitudinal extent and the transitional section 1410 can be of curved configuration, for example. This configuration of the wiring harness 1010 has the advantage that the wiring harness 1010 can be adapted flexibly in terms of its width to the installation space available on the structure 1005.

Figure 6:
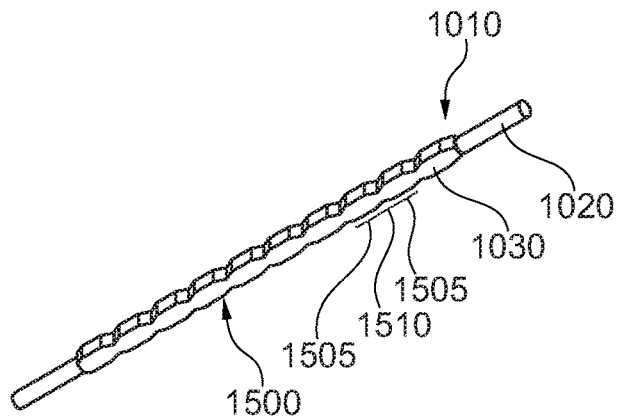
FIG. 6 shows a perspective view of a wiring harness in another embodiment.

FIG. 6 shows a perspective view of a wiring harness 1010 in another embodiment.

The wiring harness 1010 is of similar configuration to the wiring harness 1010 shown in FIGS. 1 to 5. As a departure therefrom, the lateral surface 1035 is configured with an illustrative undulating profile 1500. The profile 1500 has a first profile section 1505 and a second profile section 1510. By way of example, the first profile section 1505 is of wider configuration in the longitudinal direction than the second profile section 1510. Preferably, the first profile section 1505 is of concave configuration and the second profile section is of convex configuration. The first and second profile sections 1505, 1510 alternate in the longitudinal direction.

Figure 7:
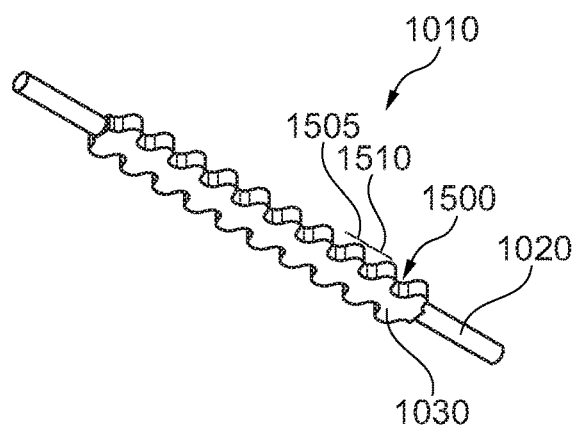
FIG. 7 shows a perspective view of a wiring harness in another embodiment.

FIG. 7 shows a perspective view of a wiring harness 1010 in another embodiment.

The wiring harness 1010 is of substantially identical configuration to the wiring harness 1010 shown in FIG. 6. As a departure therefrom, the first profile section 1505 and the second profile section 1510 are configured with an identical width.

Figure 8:
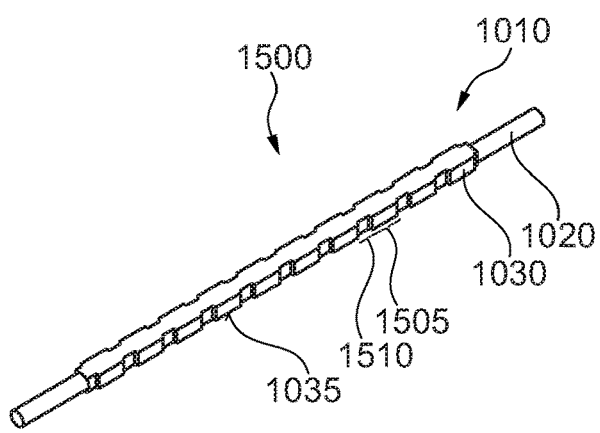
FIG. 8 shows a perspective view of a wiring harness in another embodiment.

FIG. 8 shows a perspective view of a wiring harness 1010 in another embodiment.

The wiring harness 1010 is of substantially identical configuration to the wiring harness 1010 shown in FIG. 6. As a departure therefrom, the profile 1500 is of substantially rectangular configuration, wherein the first profile section of the wiring harness 1010 shown in FIG. 6 is of substantially flat configuration and the second profile section 1510 is configured as a recess in the lateral surface 1035.

FIG. 9A shows a perspective view of a mold system 10 for manufacturing at least one wiring harness 1010 shown in FIGS. 1 to 8.

The mold system 10 preferably has a mold 15 and a mounting board 20. By way of example, the mounting board 20 is flat. The mold 15 can have a first mold part 16 and at least one second mold part 17, which each abut at one longitudinal end 18 and are arranged by means of a lower side 19 on an upper side 25 of the mounting board 20, preferably in a common plane.

FIG. 9B shows a detail of a plan view of the mold system 10 shown in FIG. 9A.

On the upper side 25, by way of example, the mounting board 20 has a grid 27 comprising a plurality of first sockets 142 of identical configuration to one another. The first sockets 142 are arranged in a regular pattern in the grid 27. For reasons of clarity, only some of the first sockets 142 have been illustrated in FIG. 9B.

FIG. 10 shows a perspective view of the first mold part 16 of the mold 15 according to a first embodiment, which is shown in FIG. 9A and FIG. 9B.

To make it easier to explain the mold 15, reference is made below to a coordinate system 26. The coordinate system 26 is preferably configured as a right-hand system and has an x direction (direction of transverse extent), a y direction (longitudinal direction) and a z direction (height).

The mold 15 has a wall 30, an opening 35 and a holding device 40. The wall 30 delimits a mold cavity 45. During the manufacture of the wiring harness 1010, the cable bundle 1020 and the envelope 1030 are introduced into the mold cavity 45 via the opening 35. The opening 35 is arranged on the upper side and adjoins the mold cavity 45. In this embodiment, by way of example, the mold cavity 45 is configured with a rectangular cross section. It is also possible for the mold cavity 45 to be configured in some other way and to have a different cross section. Thus, for example, it is also conceivable for the mold cavity 45 to be of polygonal, triangular, rounded, circular and/or elliptical configuration (in some section or sections).

The wall 30 has a first wall section 50, a second wall section 55 and a wall bottom 60. The wall bottom 60 is arranged between the first wall section 50 and the second wall section 55. The first wall section 50 and the second wall section 55 delimit the mold cavity 45 laterally. The wall bottom 60 delimits the mold cavity 45 at the bottom. The opening 35 is preferably arranged above the wall bottom 60.

The first wall section 50 has a first wall surface 61 facing the mold cavity 45, the second wall section 55 has a second wall surface 62 facing the mold cavity 45, and the wall bottom 60 has a wall base 63 facing the mold cavity 45. In this embodiment, by way of example, the first and second wall surfaces 61, 62 extend in parallel. The wall base 63 is arranged perpendicularly to the first wall surface 61 and to the second wall surface 62. The wall base 63 and/or the wall surface 61, 62 can also be arranged in a different way. Thus, the first wall surface 61 can be arranged obliquely to the second wall surface 62. It would also be conceivable for the first wall surface 61 and the second wall surface 62 to adjoin one another directly and to dispense with the wall bottom 60, with the result that the mold cavity 45 has a triangular cross section, for example.

It is particularly advantageous here if at least one of the wall surfaces 61, 62 and/or the wall base 63 is laser-polished, at least in some section or sections. A particularly good surface finish can thereby be ensured. Furthermore, scoring and/or grooves, caused, for example, by introducing the mold cavity 45 into a basic body to produce the mold 15 by means of a machining process, is/are at least partially eliminated by the laser polishing. A mold 15 which is stable over a particularly long time, by means of which a large number of wiring harnesses 1010 can be produced without additional preparation of the mold 15, is thereby ensured.

In contrast to the flat configuration of the wall surface 61, 62 and/or of the wall base 63, it is also possible for the wall surface 61, 62 and/or the wall base 63 to be profiled in an undulating and/or rib-shaped manner, at least in some section or sections.

The holding device 40 comprises a first holding element 65, a second holding element 70, a first contact pressure element 75, a second contact pressure element 80 and a first fastening means 85. By way of example, the first holding element 65 and the second holding element 70 are configured symmetrically with respect to a plane of symmetry 86, which preferably passes centrally through the mold cavity 45. The plane of symmetry 86 is preferably configured as a YZ plane. It is also possible for the first holding element 65 and the second holding element 70 to be configured differently from one another.

The mold 15 is connected positively to the mounting board 20 by means of a second fastening means 135, which, in this embodiment, by way of example, has at least one pin 140 configured as a first engagement element, by way of example. Here, the pin 140 is connected to the wall 30 and engages by means of a free longitudinal end 141 in the first socket 142 of the grid 27 of the mounting board 20, said socket being configured to correspond to the pin 140. In order to provide particularly simple mounting of the mold 15 on the mounting board 20, there is for this purpose preferably a plurality of pins 140 configured correspondingly to the first sockets 142 and identically to one another, said pins being connected to the wall 30. Depending on the alignment of the mold 15, the pins 140 each engage in a first socket 142 of the grid 27, whereas the other first sockets 142 of the grid 27 remain free. In this case, the engagement can additionally be secured nonpositively in order to prevent the mold 15 accidentally dropping off the mounting board 20, e.g. when the mold system 10 is supposed to be tilted. It is possible to achieve this, for example, by configuring the pin 140 and the socket 142 as a transition fit system or as an interference fit system.

The second fastening means 135 can also be configured in a different way. In particular, it is possible here to conceive of the second fastening means 135 being designed as a screw system.

The first socket can also be arranged on the lower side 19 of the mold part 16, 17. On the upper side of the mounting board 20, the mounting board 20 preferably has a multiplicity of pins 140 configured as first engagement elements.

Instead of the first sockets 142, the grid 27 can alternatively have the pins 140 configured as first engagement elements extending in the direction of the mold 15. In this alternative, the first socket 142 is arranged on the mold 15, preferably in the wall 30. Depending on the alignment of the mold 15, some of the pins 140 of the grid 27 each engage in the first sockets 142 in the mounted state of the mold 15 on the mounting board 20 and, as described above, secure the mold 15 reversibly on the mounting board 20. The other pins 140, which do not engage in the first socket 142, remain (at least circumferentially) free and/or covered at least in some section or sections (on the upper side) by the mold 15.

FIG. 11A shows a section through the mold 15 shown in FIG. 10, along a section plane A-A shown in FIG. 10, in a closed position of the holding elements 65, 70.

The first holding element 65 is of plate-type configuration and comprises a first section 90 and a second section 95. In this case, a first section 90 of the first holding element 65 is arranged on the upper side of the first wall section 50. The first contact pressure element 75 is arranged on the upper side of the first section 90. The first contact pressure element 75 is preferably connected nonpositively to the first wall section 50 by means of the first fastening means 85. In this case, the first fastening means 85 supplies a first clamping force $F_{S1}$, with which the first contact pressure element 75 presses the first holding element 65 onto the upper side of the first wall section 50. In this embodiment, the first contact pressure element 75 is, by way of example, configured to be precisely the same width in the X direction as the first wall section 50. It is thereby possible to ensure that the first holding element 65 is pressed reliably into contact by the first contact pressure element 75. Unwanted deformation of the first holding element 65 can furthermore be avoided.

A first free end 100 of the first holding element 70 ends above the opening 35. A second section 95 of the first holding element 65, which adjoins the first free end 100 of the first holding element 65, covers the opening 35 at the top. The second section 95 can preferably be of wedge-shaped configuration, at least in some section or sections. It is particularly advantageous here if a first lower side 105 of the first holding element 65 is of substantially flat configuration and if the first holding element 65 becomes thicker on the upper side (Z direction) from the free end 100 toward the first wall section 50.

The second holding element 70 is preferably at the same height on the opposite side, that is to say, by way of example, is arranged in a common XY plane, with respect to the first holding element 65. The second holding element 70 is arranged in mirror symmetry with respect to the plane of symmetry 86. The second holding element 70 is arranged on the upper side of the second wall section 55 and has a third section 110 and a fourth section 115, as well as being of plate-shaped configuration by way of example. The third section 110 of the second holding element 70 rests on the upper side of the second wall section 55. The second contact pressure element 80 is arranged above the third section 110. The first fastening means 85 supplies a second contact pressure force $F_{S2}$ for the second contact pressure element 80, with which the second contact pressure element 80 presses the second section 110 onto the upper side of the second wall section 55. Here, by way of example, the second contact pressure element 80 is configured to be of exactly the same width as the second wall section 55. In this case, the first contact pressure element 75 and the second contact pressure element 80 laterally delimit a first gap 120, which is exactly the same width as the opening 35.

The fourth section 115 adjoins a second free end 130 of the second holding element 70. Like the second section 95, the fourth section 115 is of wedge-shaped configuration, wherein a second lower side 125 of the second holding element 70 is arranged in a common plane with the first lower side 105 of the first holding element 65. The second free end 130 ends above the opening 35. On the upper side, the fourth section 115 thickens from the second free end 130 toward the third section 110.

Here, the fourth section 115 adjoins a second free end 130 of the second holding element 70.

The first free end 100 is preferably arranged at a distance from the second free end 130 of the second holding element 70. Here, a distance a between the first free end 100 and the second free end 130 is preferably 10 times smaller than a width of the opening 35 (in relation to a common XZ plane). As a result, the holding device (40) covers only a section of the opening 35. The first free end 100 and the second free end 130 can also be in direct contact with one another.

It is particularly advantageous if the holding element 65, 70 comprises a material which is particularly elastic and can be bent reversibly, at least by 90°, preferably into the mold cavity 45. It is particularly advantageous here if the holding element 65, 70 comprises silicone as the material. This furthermore enables the holding device 65, 70 to be configured to follow the geometrical configuration of the wall section 50, 55.

Figure 11B:
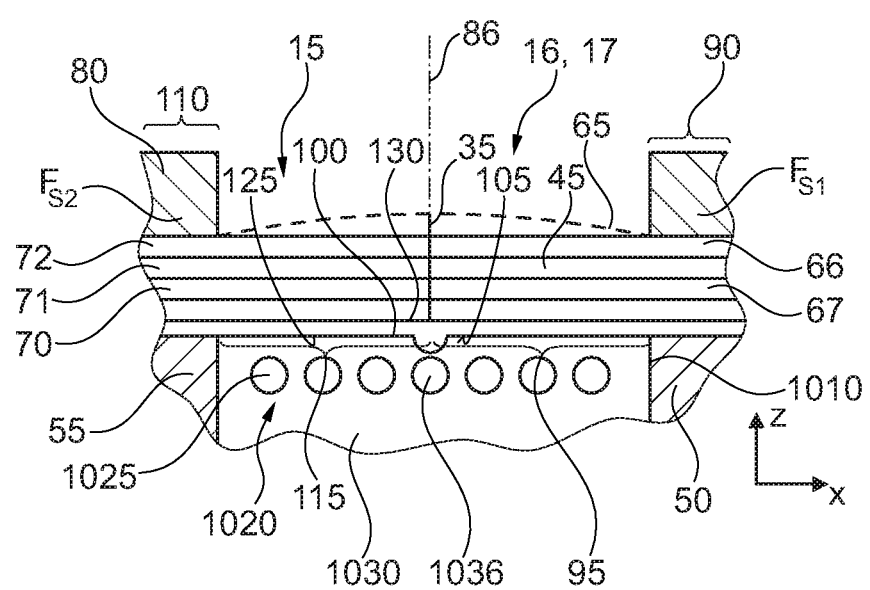
FIG. 11B shows a section through a variant of the mold shown in FIG. 10, along the section plane A-A shown in FIG. 10.

FIG. 11B shows a section through a variant of the mold 15 shown in FIG. 10, along the section plane A-A shown in FIG. 10.

The mold 15 is of substantially identical configuration to the configuration shown in FIG. 11A. As a departure therefrom, the first holding element 65 and the second holding element 70 are of brush-type configuration. In this case, the first holding element 65 has a first brush 66 with a multiplicity of brush fibers 67, and the second holding element 70 has a second brush 71 with a multiplicity of second brush fibers 72.

The brush fibers 67, 72 extend substantially in the transverse direction. In this case, the second section 95 and the fourth section 115 are wider than half the width of the opening 35 in the transverse direction (x direction). As a result, the brushes 66, 71 extend into the respectively opposite brush 66, 71 and completely close the opening 35 at the top. It is also possible for the free ends 100, 130 to be arranged at a distance from one another, as shown in FIG. 11A.

Figure 12:
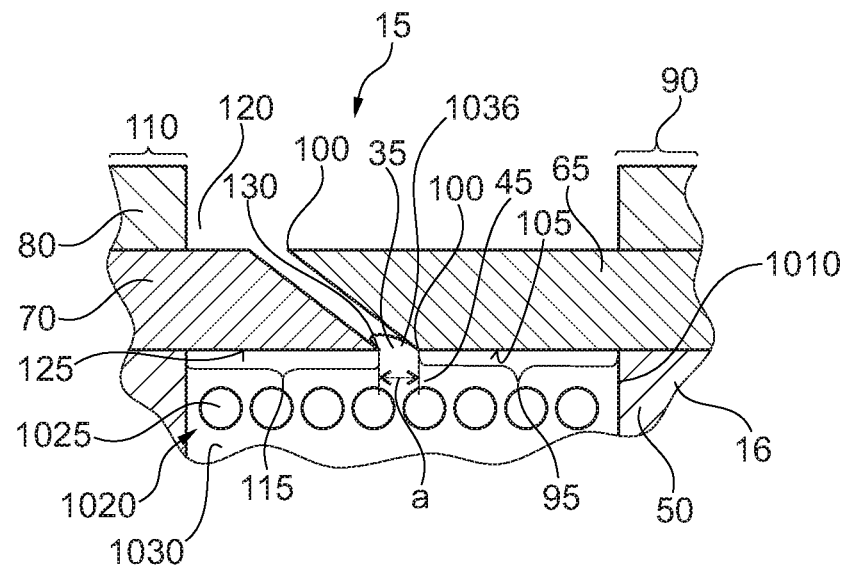
FIG. 12 shows a section through a first mold part according to a second embodiment along the section plane A-A shown in FIG. 10.

FIG. 12 shows a section through a first mold part 16 according to a second embodiment along the section plane A-A shown in FIG. 10.

The mold 15 is of similar configuration to the mold 15 shown in FIGS. 9A to 11. As a departure therefrom, the second section 95 and the fourth section 115 of the holding elements 65, 70 are arranged so as to partly overlap above the opening 35. Here, an overlap is taken to mean that they at least partly overlap when the second section 95 and the fourth section 115 are projected into a common XY plane.

The wall 30 of the first mold part 16 is of integral and materially unitary configuration. Here, the wall 30 advantageously comprises at least one of the following materials:

polypropylene (PP), polytetrafluoride (PTFE), polyethylene (PE), preferably polyethylene with highly branched polymer chains (PE-LD), polyoxymethylene (POM). In addition or as an alternative, it is also conceivable for the wall 30 to comprise a material which has a particularly low surface tension with respect to polyurethane and/or silicone.

Figure 13:
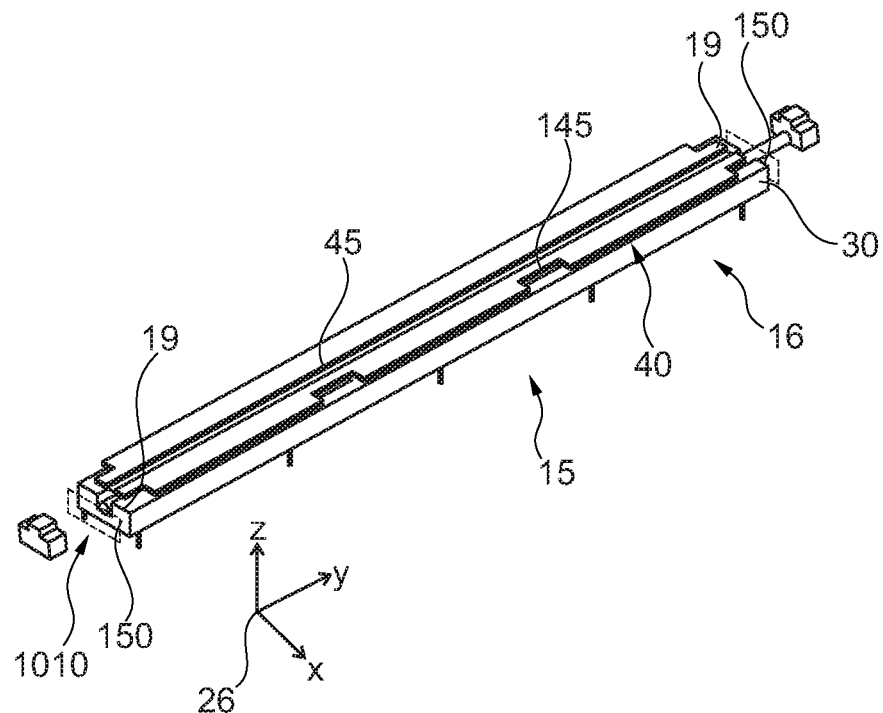
FIG. 13 shows a perspective view of a first mold part according to a third embodiment.

FIG. 13 shows a perspective view of a first mold part 16 according to a third embodiment.

The first mold part 16 is of similar configuration to the mold 15 shown in FIGS. 10 to 12. As a departure therefrom, the first mold part 16 has an increased longitudinal extent as compared with the configuration shown in FIG. 10.

The holding device 40 is configured to correspond to the increased longitudinal extent. In order to enable the second fastening means 135 to be mounted on the upper side of the wall 30, a first recess 145 is additionally provided here in the holding device 40, preferably on a side facing away from the opening 45. In this case, by way of example, the first recess 145 in the holding device 40 extends both across the holding element 65, 70 and across the contact pressure element 75, 80. The first recess 145 leads to a slimmer configuration in the X direction, i.e. transversely to the longitudinal extent of the mold 15 and of the holding device 40 in the region of the second fastening means 135.

Moreover, the first fastening means 85 and the second fastening means 135 can be combined with one another, and therefore the mold 15 and the holding device 40 are secured on the mounting board 20 by means of the combined fastening means 85, 135.

In addition, a sealing element 150 (illustrated in dashed lines) is provided opposite the mold 15 shown in FIGS. 9A to 12, at the longitudinal end 18 of the mold 15. The sealing element 150 delimits the mold cavity 45 at the longitudinal end 18. In this case, the sealing element 150 can be of plate-type configuration. It is particularly advantageous here if the sealing element 150 is arranged exclusively at the longitudinal end 18 at which the mold part 16 does not adjoin any other mold part 17. This makes it possible to avoid emergence of the envelope 1030 at the longitudinal end 18 of the mold 15 during the manufacture of the wiring harness 1010.

Figure 14:
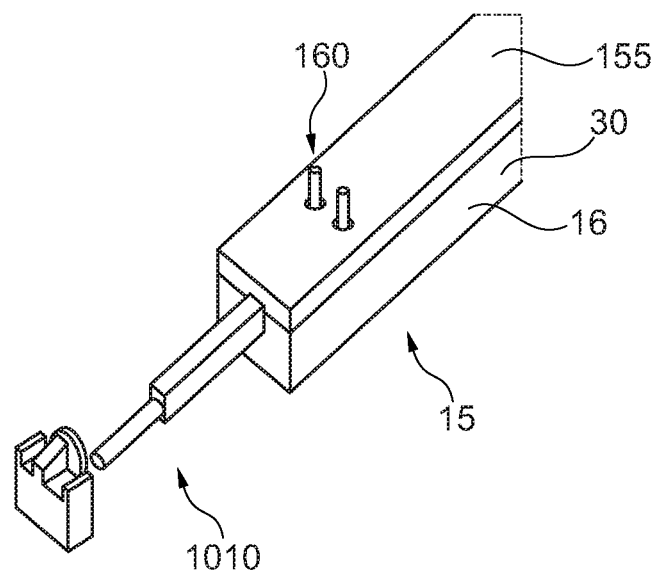
FIG. 14 shows a detail of a perspective view of the mold.

FIG. 14 shows a detail of a perspective view of the mold 15.

The first mold part 16 can be configured as described in FIGS. 9A to 13. The mold 15 additionally has a cover 155 on top of the wall 30. The cover 155 is connected to the wall 30 of the first mold part 16 by means of a third fastening means 160. Here, the cover 155 is arranged on the upper side of the holding device 40 (not illustrated in FIG. 14) and prevents the holding elements 65, 70 from being bent up in a direction away from the mold cavity 45.

Figure 15:
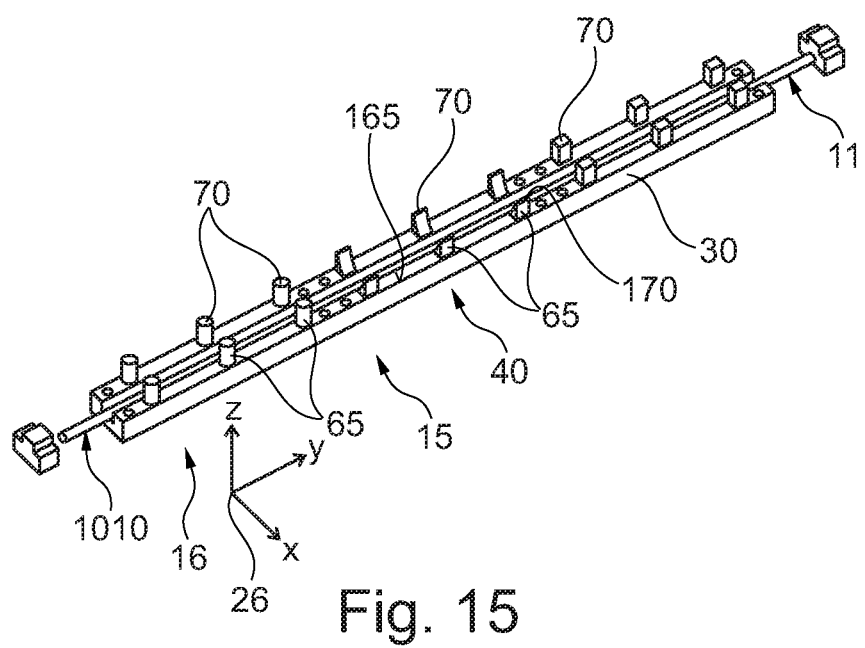
FIG. 15 shows a perspective view of a development of the mold shown in FIGS. 9A to 14.

FIG. 15 shows a perspective view of a development of the mold 15 shown in FIGS. 9A to 14.

The mold 15 is of similar configuration to the mold 15 shown in FIGS. 9A to 14. As a departure therefrom, different variants of the holding device 40 are shown in FIG. 15.

The holding device 40 comprises a multiplicity of holding elements 65, 70 arranged at regular intervals in the longitudinal direction (x direction). The holding elements 65, 70 are each connected to the wall section 50, 55. The holding element 65, 70 preferably extends perpendicularly to an upper side 165 of the wall 30. In these variants of the holding elements 65, 70, each of the holding elements 65, 70 has a different cross section in a plane parallel to the upper side 165 (xy plane). Thus, for example, the holding element 65, 70 can have a circular cross section, a rectangular cross section, a trapezoidal cross section, an elliptical cross section and/or a circular cross section. It is also conceivable that the holding element 65, 70 tapers away from the upper side 165 of the wall 30. In this case, it is particularly advantageous if the holding element 65, 70 has a wedge-shaped cross section away from the upper side 165 of the wall 30, wherein a free end 170 of the holding element 65, 70 is set back from the wiring harness 1010. It is thereby possible to facilitate insertion of individual cables 1020 of the cable bundle 1015.

In this embodiment, the first holding element 65 is in each case arranged opposite the second holding element 70, with the result that the first and the second holding element 65, 70 are each arranged in a common XZ plane.

Of course, the first and the second holding element 65, 70 can also each be arranged offset relative to one another.

Figure 16:
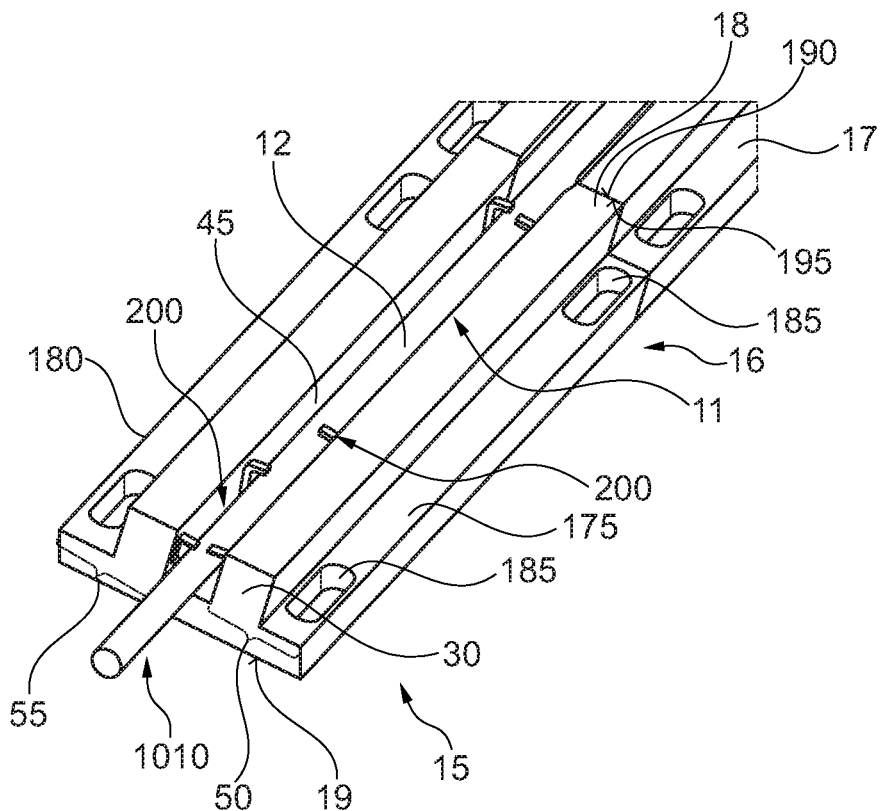
FIG. 16 shows a perspective view of a development of the mold shown in FIGS. 9A to 15.

FIG. 16 shows a perspective view of a development of the mold 15 shown in FIGS. 9A to 15. For reasons of clarity, the holding device 40 is not illustrated in FIG. 16.

The mold 15 is of similar configuration to the mold 15 shown in FIGS. 9A to 15. As a departure therefrom, the wall 30 on the first wall section 50 has a first web 175 at the side, and the second wall section 55 has a second web 180 at the side. The web 175, 180 extends away from the mold cavity 45 and adjoins the lower side 19 of the first mold part 16. Furthermore, a plurality of first apertures 185 is preferably provided in each web 175, 180. In this case, the first aperture 185 is preferably configured as a slotted hole. This enables the first mold part 16 to be positioned in a particularly accurate way in the longitudinal direction, and therefore the first mold part 16 rests by means of its longitudinal end 18 and the end face 190 adjoining the latter on a further end face 195 of the further mold part 17 arranged at the longitudinal end 18.

For the first aperture 185, the second fastening means 135 preferably has a screw instead of the pin 140. It is also possible, as shown in FIG. 10, for the mold part 16, 17 to be connected to the mounting board 20 by means of pins 140, which are anchored in the web 180, 175, for example.

The cable bundle 1020 of the wiring harness 11 is inserted into the mold cavity 45. In this case, by way of example, the cable bundle 12 is held in a predefined position by means of a first fastening element 200, 205. The first fastening element 200 is supported on the wall 30 on a side facing away from the cable bundle 12 and is embedded in the envelope 1030 of the wiring harness 1010.

More details of the first fastening element 200 are given in FIGS. 27 to 30.

Figure 17:
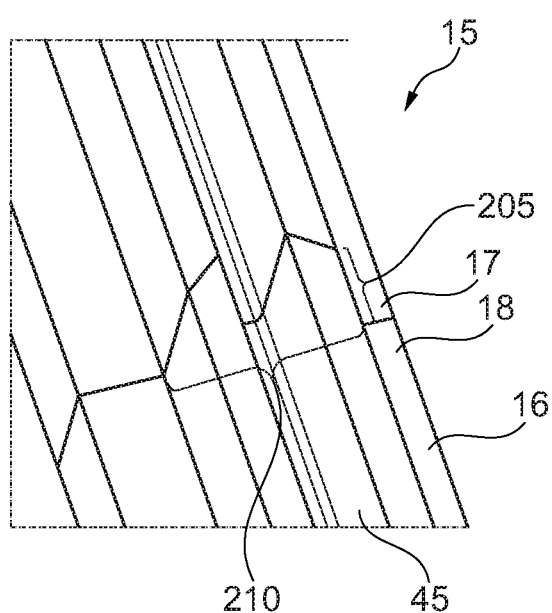
FIG. 17 shows a detail of a perspective view of a development of the mold shown in FIG. 16.

FIG. 17 shows a detail of a perspective view of a development of the mold 15 shown in FIG. 16.

The mold 15 is of similar configuration to the mold 15 shown in FIG. 16. As a departure therefrom, the first mold part 16 has a second engagement element 205 and the second mold part 17 comprises a second socket 210 configured to correspond to the second engagement element 205 in order to ensure reliable connection of the first mold part 16 to the second mold part 17. In this case, the second engagement element 205 is arranged against the end face on the longitudinal end 18 of the first mold part 16. The second engagement element 205 engages in the second socket 210, thus ensuring that the first mold part 16 is coupled positively to the second mold part 17. It is thereby possible to define a reliable alignment of the mold parts 16, 17 relative to one another. In particular, this ensures that, as shown in FIG. 17, the mold cavity 45 extends in a straight line via a transition between the first mold part 16 and the second mold part 17 and a leak at the transition is avoided.

Figure 18:
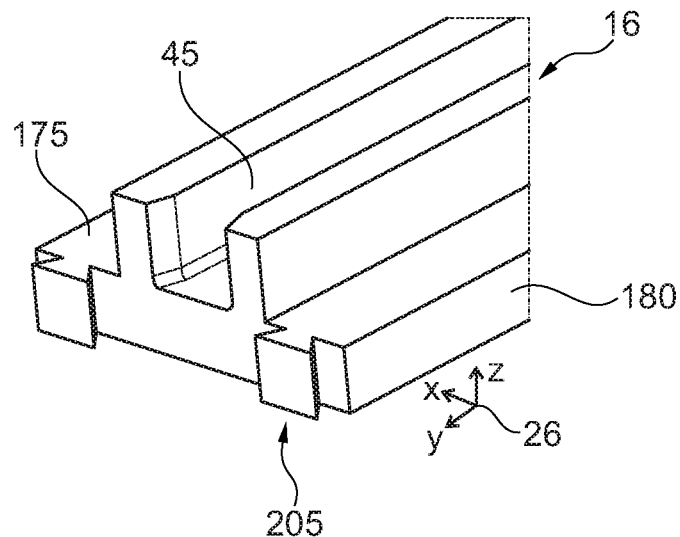
FIG. 18 shows a perspective view of the first mold part according to a fourth embodiment.

FIG. 18 shows a perspective view of the first mold part 16 according to a fourth embodiment.

Here, the first engagement element 205 is arranged on the end face of the webs 175, 180. In this case, by way of example, two second engagement elements 205, which are each preferably arranged on the web 175, 180, are provided for the end face 190 of the first mold part 160. Here, the first engagement element 205 has a trapezoidal cross section when sectioned in an xy plane, wherein the second engagement element 205 thickens away from the end face 190 of the first mold part 16.

Figure 19:
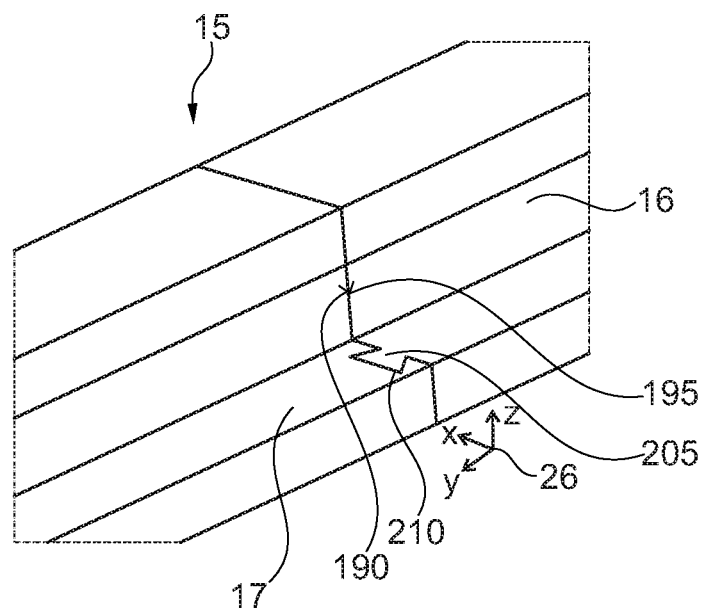
FIG. 19 shows a perspective view of the mold with the mold part shown in FIG. 18.

FIG. 19 shows a perspective view of the mold 15 comprising the first mold part 16 shown in FIG. 18 and a second mold part 17 configured to correspond to the first mold part 16. The second mold part 17 has the second socket 210, which is configured to correspond to the second engagement element 205 of trapezoidal configuration in FIG. 18. The second engagement element 205 engages in the second socket 210. By virtue of the trapezoidal cross section of the second engagement element 205, the two mold parts 16, 17 can be detached from one another only in the Z direction. It is thereby possible to ensure that no gap forms between the two end faces 190, 195 and thus that the mold cavity 45 is sealed at the end face.

Furthermore, the configuration of the second socket 210 and of the second engagement element 205 ensures that the mold parts 16, 17 can be detached reversibly from one another. In this way, the mold system 10 can be adapted particularly quickly to different configurations for the manufacture of the wiring harness 1010. Setup times for the mold system 10 can thereby be reduced.

Figure 20:
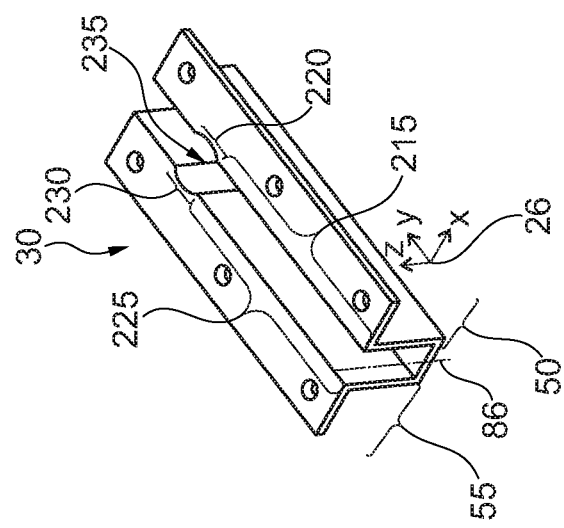
FIG. 20 shows a perspective illustration of the wall in a development.

FIG. 20 shows a perspective illustration of the wall 30 in a development of the mold 15 shown in FIGS. 10 to 19.

In this case, by way of example, the wall 30 is configured with a low wall thickness. The wall 30 can be deep-drawn, for example.

The first wall section 50 has a first wall region 215 and a second wall region 220. By way of example, the first wall region 215 and the second wall region 220 adjoin one another in the longitudinal direction. The second wall section 55 is preferably configured symmetrically with respect to the plane of symmetry 86 to the first wall section 50 and has a third wall region 225 and a fourth wall region 230. The fourth wall region 230 is preferably arranged opposite the second wall region 220 in the transverse direction (x direction), and the third wall region 215 is preferably arranged opposite the first wall region 215 in the transverse direction. The first wall region 215 and the third wall region 225 preferably extend in parallel. The second and the fourth wall region 220, 230 are of arc-shaped configuration, by way of example.

The second wall region 220 is arranged set back relative to the second wall section 55. For example, the fourth wall region 230 is arranged set back relative to the second wall region 220, such that the mold cavity 45 has a widened portion 235 between the second wall region 220 and the fourth wall region 230. The widened portion 235 can be used to form the second bulge 1120. It is also conceivable for at least one of the wall regions 220, 225, 230, 235 to have a different geometrical configuration.

Figure 21:
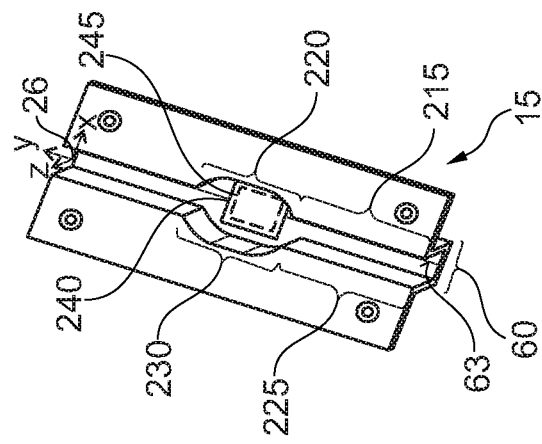
FIG. 21 shows a perspective illustration of the wall in a variant of the embodiment shown in FIG. 20.

FIG. 21 shows a perspective illustration of the wall 30 in a variant of the configuration shown in FIG. 20. As a departure therefrom, the second and the fourth wall region 220, 230 are of longer configuration in the longitudinal direction (y direction) than in FIG. 20. In this case, the second wall region 220 and the fourth wall region 230 form a widened portion 235 in the form of a slotted hole.

Furthermore, the wall 30 has a second aperture 240 in the wall bottom 60 at the level of the second and the fourth wall region 220, 230 in the longitudinal direction. By way of example, the second aperture 240 is of rectangular configuration and is configured as a through opening in the wall bottom 60. In this case, the second aperture 240 is configured to accommodate a second fastening element 400 (not shown). Further details of the second fastening element 400 are given in FIGS. 31 and 32. The second aperture 240 can also be arranged in the wall section 50, 55.

It is also possible for the second aperture 240 to be configured to correspond to an ejector 245 (illustrated in dashed lines in FIG. 21) in order to push the wiring harness 1010 out of the mold 15 from below after the manufacture of the wiring harness 1010 in the mold 15. It is thereby possible to avoid damage to the wiring harness 1010, in particular to the envelope 1040, since the envelope 1040 is subjected only to a compression load and not to a tensile load substantially by the ejector 245. The ejector 245 can rest directly on the envelope 1040 or can be applied to the second fastening element 400. If no second fastening element 400 is inserted into the second aperture 240 during the manufacture of the wiring harness 1010, the mold cavity 40 is open toward the bottom via the second aperture.

Figure 22:
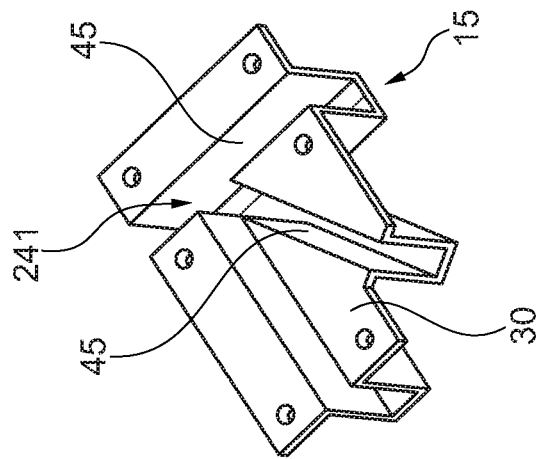
FIG. 22 shows a perspective view of the mold in another embodiment.

FIG. 22 shows a perspective view of the mold 15 in another embodiment. The wall 30 is of similar configuration to the wall 30 shown in FIGS. 20 and 21. As a departure therefrom, the wall 30 delimits a plurality of mold cavities 45, which open into one another in a common region 241. Here, the geometrical configuration shown in FIG. 22 is illustrative. The wall 30 can also be configured in some other way. The opening of the mold cavities 45 into the common region enables individual cable bundles 1020 and/or cables 1025 of the wiring harness 1010 to be branched or combined in a simple manner in the mold 15.

Figure 23:
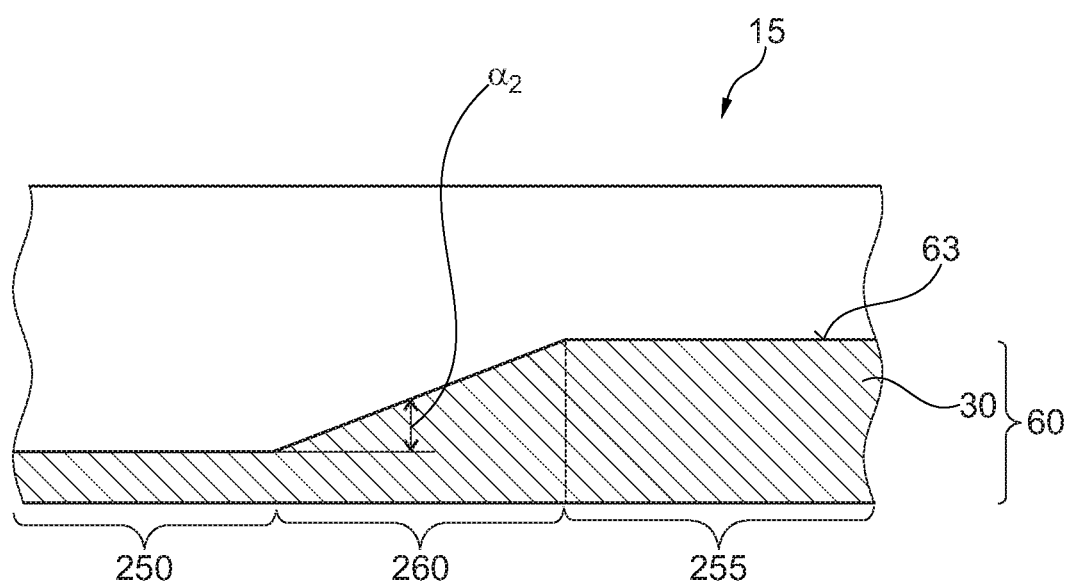
FIG. 23 shows a longitudinal section through the mold in another embodiment.

FIG. 23 shows a longitudinal section through the mold 15 in another embodiment. The mold 15 is of similar configuration to the mold 15 shown in FIGS. 9A to 22. The wall base 63 and/or the wall section 55, 60 has a first wall surface section 250, a second wall surface section 255 and a wall surface transitional section 260. The wall surface transitional section 260 is arranged between the first wall surface section 250 and the second wall surface section 255 in the longitudinal direction. In this case, the first wall surface section 250 is arranged lower than the second wall surface section 255. In this case, the first wall surface section 250 and the second wall surface section 255 are each arranged so as to extend in planes arranged offset relative to one another, preferably in parallel. The wall surface transitional section 260 is arranged with a slope relative to the first wall surface section 250 and to the second wall surface section 255. It is advantageous if the slope of the wall surface transitional section 260 has an angle $\alpha_2$, wherein the angle $\alpha_2$ has a value which is less than 45°, in particular less than 30°, in particular less than 20°, in particular less than 15°, in particular less than 10°. The wall surface section 250, 255 and the wall surface transitional section 260 enable the envelope section 1400, 1405 and the transitional section 1410 of the wiring harness 1010 to be formed.

Figure 24:
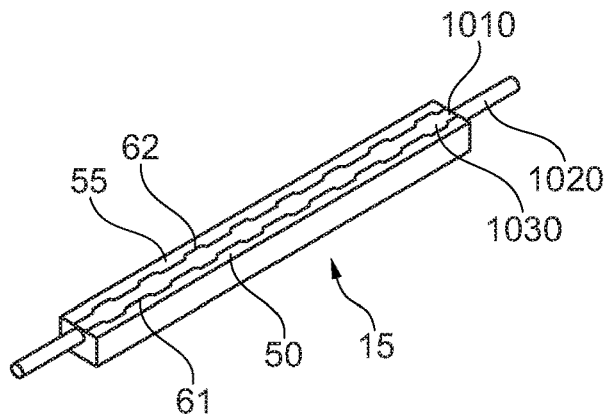
FIG. 24 shows a perspective view of a mold in another embodiment.

FIG. 24 shows a perspective view of a mold 15 in another embodiment.

The mold 15 is of similar configuration to the mold 15 shown in FIGS. 9A to 23. As a departure therefrom, the wall surface 61, 62 is configured in an undulating manner to correspond to the shaping of the profile 1500 of the wiring harness 1010 shown in FIG. 6.

Figure 25:
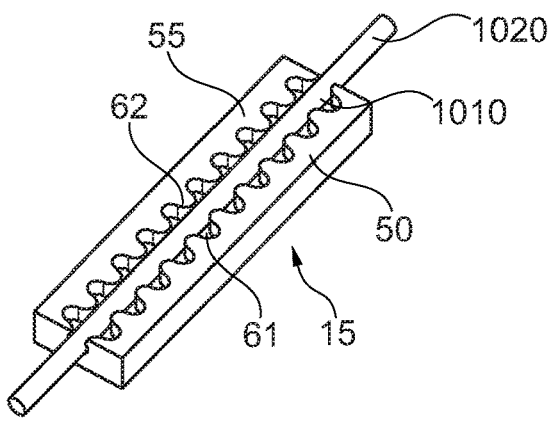
FIG. 25 shows a perspective view of a mold in another embodiment.

FIG. 25 shows a perspective view of a mold 15 in another embodiment. The mold 15 is of similar configuration to the mold 15 shown in FIG. 24, wherein the wall surface 61, 62 is configured in an undulating manner to correspond to the shaping of the profile 1500 of the wiring harness 1010 shown in FIG. 7.

Figure 26:
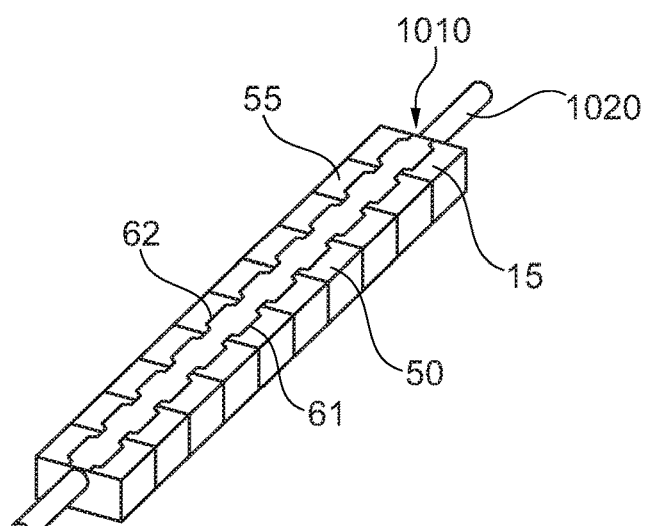
FIG. 26 shows a perspective view of a mold in another embodiment.

FIG. 26 shows a perspective view of a mold in another embodiment.

The mold 15 is of similar configuration to the mold 15 shown in FIG. 24 and FIG. 25, wherein the wall surface 61, 62 is configured in a rib-shaped manner to correspond to the shaping of the profile 1500 of the wiring harness 1010 shown in FIG. 8.

FIG. 27 shows a perspective view of the first fastening element 200 according to a first embodiment.

The first fastening element 200 has a fastening plate 300, a first fastening bracket 305 and a second fastening bracket 310. The first fastening bracket 305 and the second fastening bracket 310 are arranged spaced apart relative to one another in the longitudinal direction on the fastening plate 300. In this embodiment, the fastening plate 300 is of flat configuration by way of example. It is also possible for the fastening plate 300 to be of curved shape. The fastening plate 300 rests by means of a lateral surface 315 facing away from the fastening bracket 305, 310 on the wall surface 61, 62 and/or on the wall base 63. The fastening bracket 305, 310 has at least one laterally arranged bearing surface 311, 312, which preferably rests respectively on the wall surface 61, 62 associated therewith.

The first fastening bracket 305 has a third aperture 320. The second fastening bracket 320 has a fourth aperture 325. The third and/or the fourth aperture 320, 325 are/is configured to correspond to the cable bundle 1020 or to one or more cables 1025 of the cable bundle 1020. The third and/or fourth aperture 320, 325 can preferably be of circular configuration. Other cross sections are also conceivable. In this case, the third and the fourth aperture 320, 325 are arranged opposite one another in the longitudinal direction.

The first fastening bracket 305 has a first insertion opening 330, and the second fastening bracket 310 has a second insertion opening 335. The first insertion opening 330 opens into the third aperture 320. The second insertion opening 335 opens into the fourth aperture 325. In this case, the insertion openings 330, 335 are arranged on opposite sides of the respective fastening bracket 305, 310 in the transverse direction (X direction). Here, the insertion opening 330, 335 can preferably enclose a 90° angle segment. Stable fixing and positioning of the cable bundle 1020 and/or of one or more cables 1025 of the cable bundle 1020 in the mold cavity 45 by means of the first fastening element 200 is thereby ensured.

FIG. 28 shows a perspective view of a first fastening element 200 according to a second embodiment.

The first fastening element 200 is of similar configuration to the embodiment of the first fastening element 200 shown in FIG. 27. As a departure therefrom, the fastening bracket 305, 310 is preferably of hook-type configuration. The first fastening bracket 305 has a first bracket section 340 and a second bracket section 345. In this case, by way of example, the first bracket section 340 is formed perpendicularly to the fastening plate 300. The second bracket section 345 is oriented perpendicularly to the first bracket section 340 and, by way of example, parallel to the fastening plate 300. The second fastening bracket 310 is preferably of identical configuration to the first fastening bracket 305. As a departure therefrom, the second fastening bracket 310 is arranged offset with respect to the first fastening bracket 305 in the longitudinal direction (y direction). In this case, the second bracket section 345 of the second fastening bracket 310 extends in the direction of the second bracket section 345 of the first fastening bracket 305 (x direction) and is preferably arranged parallel to the first fastening bracket 305.

It is also possible, as shown in FIG. 28, adjoining a free end 349 of the second bracket section 345, for the second bracket section 345 to be of wedge-shaped configuration on a side facing the fastening plate 300.

FIG. 29 shows a perspective illustration of a first fastening element 200 according to a third embodiment.

The first fastening element 200 is of similar configuration to the first fastening element 200 shown in FIG. 28. As a departure therefrom, the second bracket section 345 of the first and/or of the second bracket section 305, 310 is arranged with a slope relative to the fastening plate 300. In this case, the second bracket section 345 extends obliquely downward toward the fastening plate 300. As a result, an angle between the first bracket section 340 and the second bracket section 345 is smaller than 90°. A supporting section 350 is furthermore provided between the first bracket section 340 and the fastening plate 300. In this case, the supporting section 350 has, on a side facing the second bracket section 345, a supporting surface 355, preferably configured to correspond to the cable bundle 1020 and/or to one or more cables 1025 of the cable bundle, being rounded for example. The cable bundle 1020 can thereby be fixed particularly well in the mold cavity 45 by the fastening brackets 305, 310.

FIG. 30 shows a perspective view of a first fastening element 200 according to a fourth embodiment.

The first fastening element 200 is of similar configuration to the first fastening element 200 shown in FIG. 28. As a departure therefrom, the first fastening bracket 305 and the second fastening bracket 310 are arranged at the same level in the longitudinal direction (y direction). Furthermore, the second bracket section 345 of the first fastening bracket 305 tapers toward the second bracket section 345 of the second fastening bracket 310. Here, the taper is preferably configured in such a way that the second bracket section 345 is of wedge-shaped design. The second bracket section 345 of the second fastening section 310 is of similar configuration to the second bracket section 345 of the first fastening bracket 305 and tapers toward the second bracket section 345 of the second fastening bracket 310. A second gap 360 is arranged between the second bracket section 345 of the first fastening bracket 305 and the second bracket section 345 of the second fastening bracket 310. Via the second gap 360, the cable bundle 1020 or individual cables 1025 of the cable bundle 1020 can be inserted, with the result that the cables 1025 of the cable bundle 1020 are surrounded by the fastening brackets 305, 310. This enables the cable bundle 12 to be positioned in a predefined position in the mold cavity 45.

Figure 31:
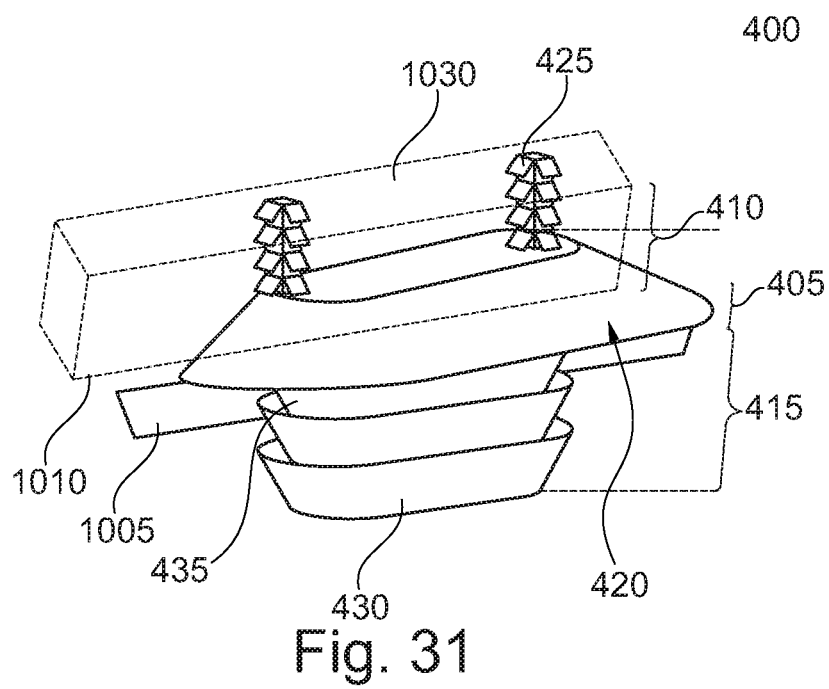
FIG. 31 shows a perspective illustration of a second fastening element.

FIG. 31 shows a perspective illustration of a second fastening element 400.

The second fastening element 400 comprises a supporting plate 405, a first engagement section 410 and a second engagement section 415. By way of example, the first engagement section 410 is arranged on the upper side of the supporting plate 405 in FIG. 31. The second engagement section 415 is arranged on the lower side of the supporting plate 405. The supporting plate 405 is configured to taper outward toward the boundary edge 420 thereof. The first engagement section 410 is of firtree-type configuration and has at least one engagement plate 425, which extends obliquely to the fastening plate 405 and is preferably arranged on all sides of the first engagement section 410. In this case, the engagement plates 425 are embedded in the envelope 1030 of the wiring harness 1010. The firtree-type configuration makes it possible to achieve particularly good fixing of the wiring harness 1010 on the second fastening element 400 via the envelope 1030.

The second engagement section 415 preferably has a rib-shaped structure 430 on the outside. In this case, the second engagement section 415 is configured to engage in an opening 435 in the structure 1005 of the vehicle component 1000 of the motor vehicle. This enables the wiring harness 11 to be fixed particularly well on the structure 1005.

It is particularly advantageous here if the second aperture 240 (cf. FIG. 21) is configured to correspond to the second engagement section 415 and the supporting plate 405 is of larger configuration on the upper side than the second aperture 240. As a result, the fastening plate 405 simultaneously acts as a sealing element and delimits the mold cavity 45 at the bottom, for example. Furthermore, a step in the envelope 1030 of the wiring harness 1010 is reduced by the fact that the supporting plate 405 tapers toward the outside.

Figure 32:
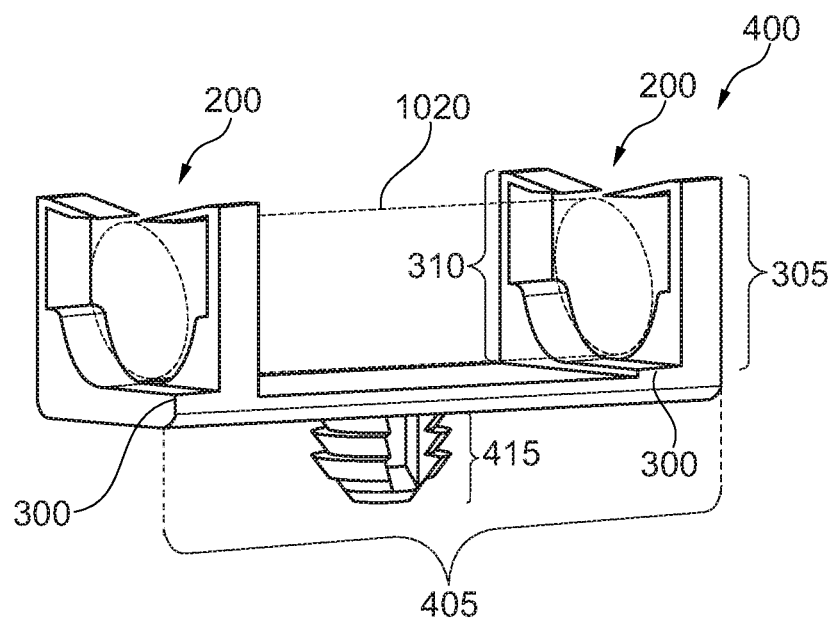
FIG. 32 shows a perspective view of the second fastening element according to a second embodiment.

FIG. 32 shows a perspective view of the second fastening element 400 according to a second embodiment. Here, the second fastening element 400 is a combination of the first fastening element 200 shown in FIG. 29 and the second fastening element 400 shown in FIG. 31. In this case, the fastening plate 300 of the first fastening element 200 is of integral and materially unitary configuration with the supporting plate 405 of the second fastening element 400. By way of example, the first engagement section 410 is dispensed with. Furthermore, by way of example, two first fastening elements 200 are arranged on the fastening plate 405. A position of the cable bundle 1020 and/or of at least one cable 1025 in the mold cavity 45 can be ensured by means of the first fastening element 200. At the same time, the wiring harness 1010 can be fixed reliably on the structure 1005 by means of the second engagement section 415 after the manufacture of the wiring harness 1010. At the same time, the supporting plate 405 preferably enters into a material joint with the envelope 1030 of the wiring harness 1010.

Figure 33:
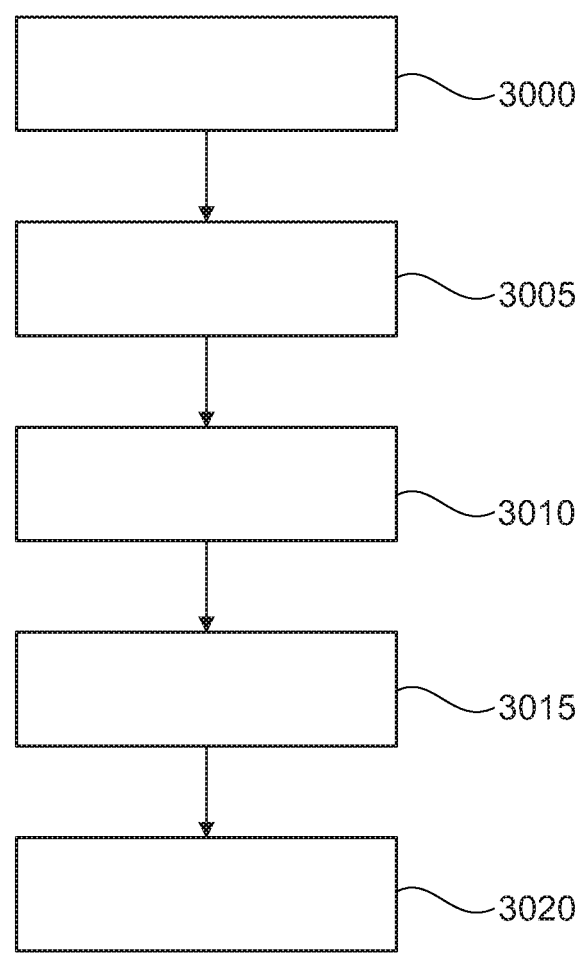
FIG. 33 shows a flow diagram of a method for manufacturing the wiring harness.
Figure 34:
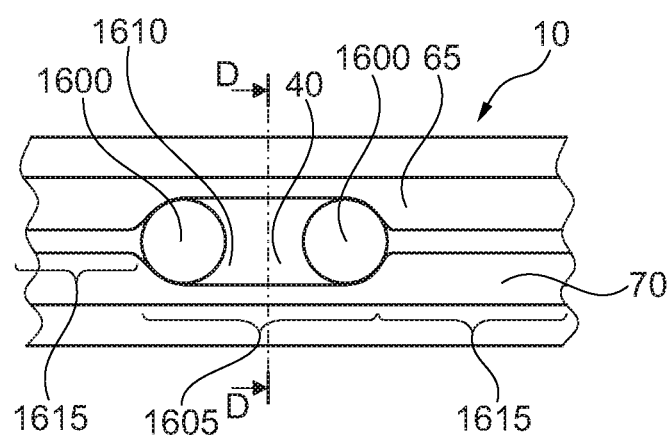
FIG. 34 shows a plan view of the mold system during a third method step.
Figure 35:
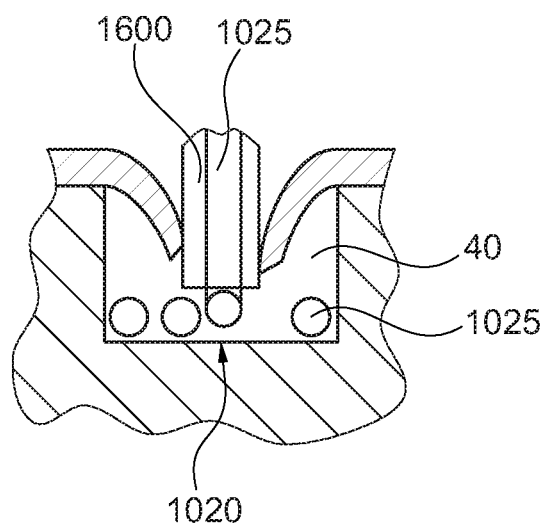
FIG. 35 shows a section along a section plane D-D shown in FIG. 34.

FIG. 33 shows a flow diagram of a method for manufacturing the wiring harness 1010. FIG. 34 shows a plan view of the mold system 10 during a third method step and FIG. 35 shows a section along a section plane D-D shown in FIG. 34.

The mold system 10 is supplied in a first method step 3000. Here, heating of the mold 15 is dispensed with, and therefore the mold 15 is substantially at room temperature. Also dispensed with is the introduction of a mold release agent into the mold cavity 45, in particular on to the wall surface 61, 62 and/or the wall base 63. It is thereby possible to avoid a situation where the cables 1025 come into contact with the mold release agent and an envelope 1030 to be introduced cannot adhere to the cables 1025.

In a second method step 3005, which is optional, the first fastening element 200 and/or the second fastening element 400 are introduced into the mold cavity 45. During this process, the second engagement element 415 is inserted into the second aperture 240 until the supporting plate 405 is resting on the wall base 63 or on the wall surface 61, 62. The first fastening element 200 is inserted in such a way that it does not project from the mold 15 at the top and/or rests by means of the bearing surface 311, 312 on the wall surface 61, 62 or is preferably seated on the wall base 63 on the lower side.

In a third method step 3010, the individual cables 1025 of the cable bundle 1020 are inserted. During this process, the first holding element 65 and the second holding element 70 are deformed reversibly out of a closed position in a first region 1605 by means of a means 1600 in such a way that an insertion opening 1610 is formed between the holding elements 65, 70. For example, the first and the second holding element 65, 70 are bent into the mold cavity 40 or bent away from the mold cavity 40. By way of example, the insertion opening is delimited in the longitudinal direction by the means 1600 and in the transverse direction by the first and the second holding element 65, 70. The means 1600 can be a mechanical tool and/or finger of a human hand and/or the cable 1025 to be inserted. By way of example, a section of the means 1600 projects into the mold cavity 40 at the top.

In a second region 1615, which adjoins the first region 1605 on both sides in the longitudinal direction, the holding elements 65, 70 are in the closed position. In addition, the first and/or the second fastening element 200, 400 optionally ensure/s a defined position of a predefined cable 1025 of the cable bundle 1020 relative to the further cables 1025 of the cable bundle 1020. The first and/or the second fastening element 200, 400 can also position and secure the cable bundle 1020 in its position in the mold cavity. In particular, heating of the cable bundle 1020 in the wiring harness 1010 can be precisely defined by virtue of the defined arrangement of one or more cables 1025 in the cable bundle 1020. In particular, overheating of the wiring harness 1010 is avoided in this case. As a result, possible self-ignition of the wiring harness 1010, short circuits or other irreversible damage to the wiring harness 1010 are avoided.

In addition, the holding device 40 prevents the cables 1025 from sliding out of the mold cavity 45 in the second region 1615. Via the insertion opening 1610, at least one of the cables 1025 of the cable bundle 1020 is inserted by moving the means 1600 in the longitudinal direction following the mold cavity 40 and, in parallel therewith, inserting the cable 1025 to be inserted from above into the mold cavity 40 via the insertion opening 1610. During the movement of the means 1600, the holding elements 65, 70 bend open in front of the means 1600 and form the insertion opening 1610 and, after the means 1600 has passed, they move back into their closed position and cover the opening 35 of the mold cavity 40.

By means of the geometrical configuration of the holding device 40 which is described in FIGS. 10 to 15, the cables 1025 can be inserted particularly quickly manually but also automatically, thus enabling the wiring harness 1010 to be manufactured at particularly low cost. Furthermore, the insertion of the cable 1025 into the mold 15 with the holding device 40 is perceived to be particularly ergonomic.

In a fourth the method step 3015, the material of the envelope 1030 is introduced into the mold cavity 45 at the top via the opening 35 in a low-pressure process. For this purpose, the holding elements 65, 70 can once more be bent reversibly out of their closed position (e.g. into the mold cavity 40 or away from the mold cavity 40) in order to introduce the material of the envelope 1030 into the mold cavity.

During this process, the second material for the formation of the second layer 1205 (cf. FIG. 3) is preferably introduced first, after which the first material of the first layer 1200 is introduced. Both the first and the second material are preferably free-flowing while being introduced. During the processing time of the material, the material sinks in the direction of gravity and, in the process, surrounds the cables 1025 of the cable bundle 1020. The second material builds up at the wall base 63 and the second layer 1205 is formed. It is particularly advantageous here if the first material is applied to the second material when the second material is already curing and the processing time of the second material has preferably already expired.

If at least part of the mold 15 is configured as described in FIG. 5, it is particularly advantageous if the material is introduced first above the first wall surface section 250 and, after the lower-lying first wall surface section 250 has been filled up, is introduced into the second wall surface section 255 above the second wall surface section 255. Finally, the material is introduced above the wall surface transitional section 260. This procedure has the advantage that the material is prevented from running down toward the first wall surface section 250 from the second wall surface section 255 via the wall surface transitional section 260.

During the introduction of the material into the mold cavity 45, it is particularly advantageous if the material of the envelope 1030 is applied in a manner fluctuating in an undulating fashion in a plane parallel to the wall base 63 between the first wall section 50 and the second wall section 55. Reliable embedding of the cables 1025 of the cable bundle 1020 in the envelope 1030 is thereby ensured.

If the material is configured in such a way that it foams during curing, the holding device 40 additionally prevents the cable bundle 1020 from being pushed out of the mold cavity 45 at the top and secures the cable bundle 1020 in the mold cavity 45. Secure enclosure of the cable bundle 1020 by the envelope 1030 is thereby ensured. Here, the first gap 120 enables the first bulge 1036 to be formed in a simple manner at the same time. In this case, the first bulge 130 can then be formed on the respective free end 100, 130 in a manner corresponding to the geometrical configuration of the holding elements 65, 70, at least in some section or sections (cf. FIG. 11A and FIG. 12). If the holding elements 65, 70 are of brush-type configuration, the first bulge 1036 is produced by the fact that, during foaming, the material presses from the mold cavity 40 against the lower side 105, 125 of the brushes 66, 71 and, as a result, the brushes 66, 71 are bent slightly upward away from the mold cavity 40 (illustrated symbolically in dashed lines in FIG. 11B). The indicating element 1038 corresponds to an impression of the brushes 66, 71. If the gap 120 is arranged between the brushes 66, 71, the material of the envelope 1040 presses especially into the gap 120, with the result that the first bulge 1036, in particular, has a lateral brush impression of the brushes 66, 71. It is also possible for the configuration of the indicating element 1038 as a notch 1040 to be produced in a particularly simple manner by means of the brushes 66, 71.

In a fifth method step 3020, the cover 155 is placed on the mold 15, wherein the cover 155 blocks bending up of the holding elements 65, 70 on a side facing away from the mold cavity 45. A particularly reliable geometrical configuration of the envelope 1030, in particular of the first bulge 1036, is thereby ensured, even when using foaming materials.

Attention is drawn to the fact that further method steps can be provided in addition to the method steps 3000, 3005, 3010, 3015, 3020 just described. It is also conceivable to dispense with some of the method steps 3000, 3005, 3010, 3015, 3020.

Attention is furthermore drawn to the fact that the different configurations of the molds 15 and/or mold parts 16, 17 described in FIGS. 9A to 26 can be combined with one another. The features of the fastening elements 200, 400 can also be combined with one another in a different way. The features of the wiring harness 1010 described in FIGS. 1 to 8 can also be combined with one another.

REFERENCE SIGNS 10 mold system
15 mold
16 first mold part
17 second mold part
18 longitudinal end
19 lower side of the mold part
20 mounting board
25 upper side of the mounting board
26 coordinate system
27 grid
30 wall
35 opening
40 holding device
45 mold cavity
50 first wall section
55 second wall section
60 wall bottom
61 first wall surface
62 second wall surface
63 wall base
65 first holding element
70 second holding element
75 first contact pressure element
80 second contact pressure element
85 first fastening means
86 plane of symmetry
90 first section of the first holding element
95 second section of the first holding element
100 first free end of the first holding element
105 first lower side of the first holding element
110 third section
115 fourth section
120 gap
125 second lower side
130 second free end
135 second fastening means
140 pin (first engagement element)
141 free end of the pin
142 first socket
145 first recess
150 sealing element
155 cover
160 third fastening means
165 upper side of the wall
170 free end of the holding element
175 first web
180 second web
185 first aperture
190 end face of the mold part
195 end face of the further mold part
200 first fastening element
205 second engagement element
210 second socket
215 first wall region
220 second wall region
225 third wall region
230 fourth wall region
235 widened portion
240 second aperture
241 common region
245 ejector
250 first wall base section
255 second wall base section
260 wall base transitional section
300 first fastening plate
305 first fastening bracket
310 second fastening bracket
311 bearing surface of the fastening bracket
312 bearing surface of the fastening bracket 315 lateral surface
320 third aperture
325 fourth aperture
330 first insertion opening
335 second insertion opening
340 first bracket section
345 second bracket section
349 free end of the second bracket section
350 supporting section
355 supporting surface
360 second gap
400 second fastening element
405 fastening plate
410 first engagement section
415 second engagement section
420 boundary edge
425 engagement plate
430 structure
1000 body
1005 structure
1006 holding structure
1010 wiring harness
1015 bearing surface
1020 cable bundle
1025 cable of the cable bundle
1030 envelope
1035 lateral surface
1036 first bulge
1037 upper side
1038 indicating element
1040 notch
1100 first space
1105 second space
1110 partition wall
1115 opening
1120 second bulge
1121 bulge contour
1122 opening contour
1200 first layer
1205 second layer
1210 third layer
1215 surface structure
1220 surface
1225 rib structure
1230 rib
1235 rib recess
1240 recess base of the rib recess
1300 recess
1305 recess contour
1310 surface of the structure
1400 first envelope section
1405 second envelope section
1410 transitional section
1415 lateral surface of the first envelope section
1420 lateral surface of the second envelope section
1425 transitional surface
1500 profile
1505 first profile section
1510 second profile section
1600 means
1605 first region
1610 insertion opening
1615 second region
3000 first method step
3005 second method step
3010 third method step
3015 fourth method step
3020 fifth method step
a distance
$b_1$ first transverse extent
$b_2$ second transverse extent

The invention claimed is:

1. A wiring harness for a motor vehicle, comprising:
   at least one cable bundle comprising at least two cables, and an envelope,
   wherein at least some section or sections of the at least two cables of the cable bundle are embedded in the envelope,
   wherein the envelope has an indicating element on the outside,
   wherein the indicating element is routed parallel to the cable bundle in order to indicate a position of the cable bundle in the envelope,
   wherein the indicating element extends along a longitudinal extent of the envelope,
   wherein the indicating element has a first bulge,
   wherein the first bulge is of bead-type configuration,
   wherein the first bulge projects above the outside of the envelope and extends parallel to the cable bundle,
   and/or
   wherein the indicating element has a notch on the outside of the envelope,
   wherein the indicating element comprises a brush impression.

2. A wiring harness,
   for a motor vehicle, comprising:
   at least one cable bundle comprising at least two cables and an envelope,
   wherein at least some section or sections of the cable bundle is/are embedded in the envelope,
   wherein the envelope has a second bulge,
   wherein the wiring harness can be passed through an opening in a structure of a vehicle component,
   wherein the second bulge extends with a slope relative to a longitudinal extent of the cable bundle,
   wherein the second bulge has a bulge contour,
   wherein the second bulge is configured to press the bulge contour against an opening contour of the opening in order to provide substantially fluidtight separation between the spaces of the vehicle component,
   and/or
   wherein the envelope has a second bulge,
   wherein the second bulge extends with a slope relative to a longitudinal extent of the cable bundle,
   wherein the second bulge has a bulge contour,
   wherein the second bulge is configured to press the bulge contour against a recess contour of a recess in a structure of a vehicle component in order to provide a frictional connection between the recess and the second bulge and to fasten the wiring harness frictionally in the recess.

3. A mold for producing a wiring harness,
   comprising a wall, an opening and a holding device,
   wherein the wall delimits a mold cavity, at least laterally,
   wherein the mold cavity adjoins the opening at the top,
   wherein the holding device is arranged on the wall and covers the opening, at least in some section or sections in a closed position,
   wherein the holding device is of plate-type and/or brush-type configuration,
   wherein the holding device comprises a material which is capable of reversible elastic deformation, wherein the holding device can be reversibly bent through at least 70°, preferably through 90°, into the mold cavity or can be bent away from the mold cavity in such a way that the opening is free in a first region, at least in some section or sections, and the holding device remains in the closed position in a second region and closes the opening, wherein the holding device forms the indicating element at least in some section or sections to correspond to a geometrical configuration of the holding device.

4. The mold according to claim 3, wherein the wall has a first wall section and a second wall section, wherein the first wall section is arranged opposite the second wall section, wherein the holding device comprises a first holding element and a second holding element, wherein the first holding element is arranged on the first wall section, and the second holding element is arranged on the second wall section, wherein the first holding element and the second holding element each end with a free end over the opening and at least partly close the mold cavity, wherein the first wall section and/or the second wall section are/is preferably provided with an undulating profile, at least in some section or sections, wherein the free ends of the holding elements are arranged spaced apart, and/or wherein the holding elements are arranged in an overlapping manner over the opening, and/or wherein the first wall section has a first wall region and a second wall region, wherein the second wall region extends in a manner offset from the first wall region in a direction away from the second wall section, with the result that the mold cavity forms a widened portion.

5. A mold for producing a wiring harness, comprising a wall, an opening and a holding device, wherein the wall delimits a mold cavity, at least laterally, wherein the mold cavity adjoins the opening at the top, wherein the wall has a first wall surface section, a second wall surface section and a wall surface transitional section, wherein the first wall surface section is arranged lower than the second wall surface section, wherein the wall surface transitional section is arranged between the first wall surface section and the second wall surface section, wherein the wall surface transitional section is arranged with a slope relative to the first wall surface section and the second wall surface section, wherein the slope preferably has an angle ($\alpha_2$), wherein the angle ($\alpha_2$) has a value which is less than 45°, in particular less than 30°, in particular less than 20°, in particular less than 15°, in particular less than 10°, wherein the first wall surface section and the second wall surface section are preferably arranged in two planes arranged parallel to one another, wherein preferably the holding device is configured so as to follow the wall and to be interrupted in some section or sections and/or to be continuous, and/or wherein the holding device comprises silicone as the material, and/or wherein the wall comprises at least one of the following materials:

polytetrafluoride (PTFE), polyoxymethylene (POM).

6. A method for manufacturing a wiring harness for a motor vehicle, wherein a mold is provided, wherein at least two cables of the cable bundle are laid in the mold cavity, wherein, as the at least one of the cables is laid in the mold cavity, the holding device is deformed and opened reversibly in such a way out of a closed position in a first region by means of a means that the opening is upwardly open in the first region and the holding device remains in the closed position in a second region and closes the opening, wherein the at least one of the cables is laid in the mold cavity through the first region, wherein the means is moved along the mold cavity, wherein, after the removal of the means, the holding device relaxes and closes the mold cavity again, wherein at least one material of the envelope is introduced into the mold cavity, wherein the material surrounds the at least two cables in a processing time of the material of the envelope and, in doing so, encloses the at least two cables of the cable bundle, at least in some section or sections.

7. The method according to claim 6, wherein, as the cable is laid in the first region, the first holding element and the second holding element are bent apart reversibly out of a closed position by the means, preferably being bent out into the mold cavity or away from the mold cavity or being bent in the longitudinal direction of the mold cavity, wherein, after the removal of the means, the holding elements bend back into the closed position and close the opening again.

8. The method according to claim 6, wherein, after the introduction of the material of the envelope into the mold cavity, a cover is placed on the holding device, wherein the cover at least partially blocks bending open of the holding device on a side facing away from the mold cavity, and/or wherein the material of the envelope is first of all introduced into the mold cavity above the first wall surface section and, during a subsequent time period, is introduced into the mold cavity above the second wall surface section and into the mold cavity above the wall surface transitional section, and/or wherein the material of the envelope is applied in a manner fluctuating in an undulating fashion between the first wall section and the second wall section, varying in the transverse direction with respect to the cable bundle.

9. A wiring harness for a motor vehicle,
wherein a mold is provided,
wherein at least two cables of the cable bundle are laid into the mold cavity,
wherein, as the at least one of the cables is laid in the mold cavity, the holding device is deformed and reversibly opened out of a closed position in a first region of a means in such a way that the opening is upwardly open in the first region and the holding device remains in the closed position in a second region and closes the opening,
wherein the at least one of the cables is laid into the mold cavity through the first region,
wherein the means is moved along the mold cavity,
wherein, after the removal of the means, the holding device relaxes and closes the mold cavity again,
wherein at least one material of the envelope is introduced into the mold cavity,
wherein the material surrounds the at least two cables in a processing time of the material of the envelope and, in doing so, encloses the at least two cables of the cable bundle, at least in some section or sections,
wherein the material foams during curing and the holding device prevents the cable bundle from being pushed out of the mold cavity securing the cable bundle in the mold cavity,
wherein the holding device forms a first bulge and/or a notch in the envelope to indicate a position of the cable bundle in the envelope.

\* \* \* \* \*